(12) United States Patent
Nishiwaki et al.

(10) Patent No.: US 7,142,489 B2
(45) Date of Patent: Nov. 28, 2006

(54) OPTICAL DISK DEVICE WITH PHOTODETECTOR

(75) Inventors: Seiji Nishiwaki, Kobe (JP); Kazuo Momoo, Hirakata (JP); Youichi Saitoh, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/530,585

(22) PCT Filed: Oct. 16, 2003

(86) PCT No.: PCT/JP03/13226

§ 371 (c)(1),
(2), (4) Date: Apr. 7, 2005

(87) PCT Pub. No.: WO2004/040562

PCT Pub. Date: May 13, 2004

(65) Prior Publication Data
US 2006/0013107 A1    Jan. 19, 2006

(30) Foreign Application Priority Data
Oct. 17, 2002   (JP) .............................. 2002-302932

(51) Int. Cl.
*G11B 7/00* (2006.01)
(52) U.S. Cl. .............................. 369/44.41; 369/112.12
(58) Field of Classification Search ...................... None
See application file for complete search history.

(56) References Cited

U.S. PATENT DOCUMENTS

| 6,091,690 A | 7/2000 | Sano et al. .............. 369/112.1 |
| 6,256,285 B1 * | 7/2001 | Coombs ................ 369/112.03 |
| 6,407,973 B1 | 6/2002 | Ophey ................... 369/112.07 |

(Continued)

FOREIGN PATENT DOCUMENTS

JP    2000-132848    5/2000

*Primary Examiner*—William Korzuch
*Assistant Examiner*—Christopher Lamb
(74) *Attorney, Agent, or Firm*—Hamre, Schumann, Mueller & Larson, P.C.

(57) ABSTRACT

An optical disk device is provided that can realize favorable recording/reproduction of signals on/from an optical disk having a plurality of signal planes arranged in proximity to each other. In this optical disk device, a hologram (4) is divided into $n(n \geq 2)$ regions Ak(k=1, 2, ..., n) by a straight line that intersects with an optical axis, and a photodetector (7) is divided into at least two regions A and A'. Light emitted from a light source (1) is focused on a signal plane (6a) or (6b) included in a plurality of signal planes of the optical disk by an objective lens (5). Light reflected from a first signal plane (6a) and light reflected from a second signal plane (6b) pass through the objective lens (5) to turn into light beams a and a', respectively, that enter the hologram (4). 1st-order diffracted light beams ak and ak' having a common diffraction optical axis are derived from the light beams a and a' that have entered the regions Ak of the hologram (4), respectively, and are projected on the photodetector (7). Distributions of the 1st-order diffracted light beams ak and ak' on the photodetector (7) are approximately inverted with respect to an intersection point of the diffraction optical axis and a detection plane. The 1st-order diffracted light beam ak is approximately within the region A and the 1st-order diffracted light beam ak' is approximately within the region A'.

8 Claims, 21 Drawing Sheets

U.S. PATENT DOCUMENTS 6,927,375 B1 *  8/2005  Yamamoto et al. ...... 250/201.5
6,967,908 B1 * 11/2005  Ogasawara et al. ...... 369/44.42
7,016,269 B1 *  3/2006  Ogasawara et al. ...... 369/44.25

* cited by examiner

US 7,142,489 B2

OPTICAL DISK DEVICE WITH PHOTODETECTOR

This application is a 371 of PCT/JP03/13226 Oct. 16, 2003.

TECHNICAL FIELD

The present invention relates to an optical disk device used for recording signals on an optical disk or reproduction signals recorded on an optical disk.

BACKGROUND ART

Conventionally, as such an optical disk device, the one disclosed in JP2000-132848 A has been known, for example. Based on this precedent with a part thereof being modified, the following description is made with reference to FIGS. 26 to 30.

FIG. 26 is a schematic cross-sectional view showing a conventional optical disk device (in the case where a focal point of an objective lens is on a first signal plane of an optical disk). FIG. 27 shows a hologram pattern formed on a hologram that is used in the optical disk device. FIG. 28 shows a photodetection pattern formed on a photodetector that is used in the optical disk device and light distribution on the photodetector in the state shown in FIG. 26. FIG. 29 is a schematic cross-sectional view showing the conventional optical disk device (in the case where a focal point of the objective lens is on a second signal plane of the optical disk). FIG. 30 shows a photodetection pattern formed on the photodetector that is used in the optical disk device and light distribution on the photodetector in the state shown in FIG. 29.

As shown in FIG. 26, the conventional optical disk device includes a light source 1, a collimator lens 3 for converting light emitted from the light source 1 into parallel light, an objective lens 5 for focusing the parallel light on an optical disk, a hologram 4 for diffracting the light reflected by the optical disk (i.e., returned light), a beam splitter 2 for bending a light path of the returned light that has passed through the hologram 4 and then the collimator lens 3, and a photodetector 7 on which the returned light whose light path has been bent by the beam splitter 2 is focused.

The optical disk includes a substrate 6 made of a transparent material, a semi-transparent first signal plane 6a formed on a surface of the substrate 6, and a second signal plane 6b formed in proximity to the first signal plane 6a on the back side of the first signal plane 6a (i.e., on the side farther from the objective lens 5). The distance d between the first signal plane 6a and the second signal plane 6b generally is about 20 to several tens μm, and a transparent medium having a refractive index n(n=about 1.5) fills a space between the first signal plane 6a and the second signal plane 6b.

As shown in FIG. 27, the hologram 4 is divided into four equal parts, namely, a first quadrant 41, a second quadrant 42, a third quadrant 43, and a fourth quadrant 44, by straight lines that intersect with each other at an intersection point 40 of the optical axis and a surface of the hologram 4. A pattern is formed in each of these four regions.

As shown in FIG. 28, the photodetector 7 includes detector cells 7F1, 7F2, 7F3, and 7F4 divided by straight lines 7Fa and 7Fb and detector cells 7T1, 7T2, 7T3, and 7T4 divided by straight lines 7Ta, 7Tb, and 7Tc.

As shown in FIG. 26, light emitted from the light source 1 passes through the beam splitter 2 and is converged by the collimator lens 3 to turn into parallel light. After passing through the hologram 4, the parallel light is focused on the first signal plane 6a of the optical disk by the objective lens 5 (the light path is indicated with a solid line). Returned light 8a, which is the light reflected by the first signal plane 6a, is converged by the objective lens 5 and enters the hologram 4 to be diffracted by the hologram 4. The returned light 8a diffracted by the hologram 4 then is converged by the collimator lens 3 and is reflected by a split plane 2a of the beam splitter 2, whereby the light path of the returned light 8a is bent. The returned light 8a whose light path has been bent then is focused on the photodetector 7 (the light path of a 0th-order diffracted light beam resulting from the diffraction by the hologram 4 is indicated with a solid line).

The first signal plane 6a of the optical disk is semi-transparent. Thus, among light focused on the first signal plane 6a, light passing through the first signal plane 6a reaches the second signal plane 6b. Then, returned light 8b, which is the light reflected by the second signal plane 6b, passes through the first signal plane 6a again, is converged by the objective lens 5, and enters the hologram 4 to be diffracted by the hologram 4. The returned light 8b diffracted by the hologram 4 then is converged by the collimator lens 3 and is reflected by the split plane 2a of the beam splitter 2, whereby the light path of the returned light 8b is bent. The returned light 8b whose light path has been bent then is focused on the photodetector 7 (the light path of a 0th-order diffracted light beam is indicated with a dashed line). Note here that the focal point of the returned light 8b is on the front side of the focal point of the returned light 8a (i.e., on the side closer to the beam splitter 2).

Light reflected by the optical disk, i.e., returned light 8, is divided equally (or substantially equally) into four light beams, namely, a first quadrant light beam 81a (or 81b), a second quadrant light beam 82a (or 82b), a third quadrant light beam 83a (or 83b), and a fourth quadrant light beam 84a (or 84b) by the first quadrant 41 to the fourth quadrant 44, respectively, where the first quadrant light beam 81a to the fourth quadrant light beam 84a refer to the light beams derived from the returned light 8a that is reflected by a signal plane on/from which signals are recorded/reproduced (in this case, the first signal plane 6a) and enters the first quadrant 41 to the fourth quadrant 44 of the hologram 4, respectively, and the first quadrant light beam 81b to the fourth quadrant light beam 84b refer to the light beams derived from the returned light 8b that is reflected by a signal plane on/from which signals are not recorded/reproduced (in this case, the second signal plane 6b) and enters the first quadrant 41 to the fourth quadrant 44 of the hologram 4, respectively. These quadrant light beams are diffracted in the respective quadrants.

When the returned light 8a is projected on the photodetector 7, a 1st-order diffracted light beam 8a1 derived from the first quadrant light beam 81a forms a light spot 8a1S astride the border between the detector cells 7F1 and 7F4, a −1st-order diffracted light beam 8a1' derived from the first quadrant light beam 81a forms a light spot 8a1S' within the detector cell 7T1, a 1st-order diffracted light beam 8a2 derived from the second quadrant light beam 82a forms a light spot 8a2S astride the border between the detector cells 7F1 and 7F4, a −1st-order diffracted light beam 8a2' derived from the second quadrant light beam 82a forms a light spot 8a2S' within the detector cell 7T2, a 1st-order diffracted light beam 8a3 derived from the third quadrant light beam 83a forms a light spot 8a3S astride the border between the detector cells 7F2 and 7F3, a −1st-order diffracted light beam 8a3' derived from the third quadrant light beam 83a forms a light spot 8a3S' within the detector cell 7T3, a 1st-order diffracted light beam 8a4 derived from the fourth quadrant light beam 84a forms a light spot 8a4S astride the border between the detector cells 7F2 and 7F3, and a −1st-order diffracted light beam 8a4' derived from the fourth quadrant light beam 84a forms a light spot 8a4S' within the detector cell 7T4 (the respective light spots are indicated with solid lines).

When the returned light 8b is projected on the photodetector 7, a 1st-order diffracted light beam 8b1 derived from the first quadrant light beam 81b forms a light spot 8b1S, a −1st-order diffracted light beam 8b1' derived from the first quadrant light beam 81b forms a light spot 8b1S', a 1st-order diffracted light beam 8b2 derived from the second quadrant light beam 82b forms a light spot 8b2S, a −1st-order diffracted light beam 8b2' derived from the second quadrant light beam 82b forms a light spot 8b2S', a 1st-order diffracted light beam 8b3 derived from the third quadrant light beam 83b forms a light spot 8b3S, a −1st-order diffracted light beam 8b3' derived from the third quadrant light beam 83b forms a light spot 8b3S', a 1st-order diffracted light beam 8b4 derived from the fourth quadrant light beam 84b forms a light spot 8b4S, and a −1st-order diffracted light beam 8b4' derived from the fourth quadrant light beam 84b forms a light spot 8b4S' (the respective light spots are indicated with dashed lines).

A point 80S shown in FIG. 28 is a focal point of 0th-order diffracted light beams derived from the first quadrant light beam 81a, the second quadrant light beam 82a, the third quadrant light beam 83a, and the fourth quadrant light beam 84a passing through the respective quadrants of the hologram 4 on the photodetector 7, and the light spots 8a1S, 8a2S, 8a3S, and 8a4S and the light spots 8a1S', 8a2S', 8a3S', and 8a4S' are minutely converged light spots that are close to diffraction focal points.

Therefore, it is possible to set the width w of the photodetector 7 to be as small as about 60 μm in accordance with the size of these light spots. Furthermore, since the focal point of the returned light 8b is on the front side of the focal point of the returned light 8a (i.e., on the side closer to the beam splitter 2), the light spots 8b1S, 8b2S, 8b3S, and 8b4S and the light spots 8b1S', 8b2S', 8b3S', and 8b4S' have shapes similar to those obtained by inverting the first quadrant light beam 81b, the second quadrant light beam 82b, the third quadrant light beam 83b, and the fourth quadrant light beam 84b with respect to the intersection point 40, respectively, and most of their regions are on the detector cells 7F2 and 7F4 and the detector cells 7T1, 7T2, 7T3, and 7T4 as stray light components.

FIG. 29 is the same as FIG. 26 except that the focal point of the objective lens 5 is on the second signal plane 6b of the optical disk (i.e., the second signal plane 6b is a signal plane on/from which signals are recorded/reproduced) and that the focal point of the returned light 8b reflected by the first signal plane 6a is on the back side of the focal point of the returned light 8a reflected by the second signal plane 6b (i.e., on the side farther from the beam splitter 2). The duplicate description will be omitted here.

Similar to FIG. 28, a point 80S shown in FIG. 30 is a focal point of 0th-order diffracted light beams derived from the first quadrant light beam 81a, the second quadrant light beam 82a, the third quadrant light beam 83a, and the fourth quadrant light beam 84a passing through the respective quadrants of the hologram 4 on the photodetector 7, and the light spots 8a1S, 8a2S, 8a3S, and 8a4S and the light spots 8a1S', 8a2S', 8a3S', and 8a4S' are minutely converged light spots that are close to diffraction focal points.

In the optical disk device shown in FIG. 29, the focal point of the returned light 8b is on the back side of the focal point of the returned light 8a, unlike the case of FIG. 26. Thus, the light spots 8b1S, 8b2S, 8b3S, and 8b4S and the light spots 8b1S', 8b2S', 8b3S', and 8b4S' have shapes similar to those of the first quadrant light beam 81b, the second quadrant light beam 82b, the third quadrant light beam 83b, and the fourth quadrant light beam 84b, respectively, and most of their regions are on the detector cells 7F1, 7F2, 7F3, and 7F4 and the detector cells 7T1, 7T2, 7T3, and 7T4 as stray light components.

Some of the detector cells are electrically connected, so that the following six signals can be obtained.

F1=a signal obtained in the detector cell 7F1+a signal obtained in the detector cell 7F3

F2=a signal obtained in the detector cell 7F2+a signal obtained in the detector cell 7F4

T1=a signal obtained in the detector cell 7T1

T2=a signal obtained in the detector cell 7T2

T3=a signal obtained in the detector cell 7T3

T4=a signal obtained in the detector cell 7T4

With the arrow 6R shown in FIG. 27 indicating the radial direction of the optical disk, a focus error signal FE that indicates an error in focusing light on the optical disk signal plane, a tracking error signal TE that indicates an error in tracking an optical disk track, and a reproduction signal RF that is reproduced from the optical disk signal plane are detected based on the following formulae (1) to (3).

$$FE = F1 - F2 \quad \text{Formula (1)}$$

$$TE = T1 + T4 - T2 - T3 \quad \text{Formula (2)}$$

$$RF = F1 + F2 + T1 + T2 + T3 + T4 \quad \text{Formula (3)}$$

FIG. 31 shows the relationship between defocus and a focus error signal FE in the conventional optical disk device. FIG. 31 shows the relationship in the case where the photodetector 7 has a width w of 60 μm and the optical disk has the first signal plane 6a alone as a signal plane and is not provided with the second signal plane 6b (alternatively, the optical disk has the second signal plane 6b alone as a signal plane and is not provided with the first signal plane 6a). Note here that the defocus caused when the objective lens 5 approaches the optical signal plane is regarded as the negative (−) defocus. An FS signal in FIG. 31 is represented by F1+F2. In the conventional optical disk device, a detector shape formed by the detector cells 7T1, 7T2, 7T3, and 7T4 as a whole substantially is equal to that formed by the detector cells 7F1, 7F2, 7F3, and 7F4 as a whole. Thus, it may be considered that the reproduction signal RF that is reproduced from the optical disk signal plane is detected based on the following formula (4).

$$RF = 2 \times FS \quad \text{Formula (4)}$$

The above-described conventional optical disk device has the following problem. In the conventional optical disk device, most of the regions of the light spots 8b1S, 8b2S, 8b3S, and 8b4S and the light spots 8b1S', 8b2S', 8b3S', and 8b4S' are on the detector cells 7F1, 7F2, 7F3, and 7F4 and the detector cells 7T1, 7T2, 7T3, and 7T4. In the conventional optical disk device, it is possible to reduce an area of the portions where the light spots overlap the detector cells by reducing the width w of the photodetector 7. However, considering the margin needed for a position error of the light spots relative to the photodetector 7, the smallest possible width w of the photodetector 7 is about 60 μm. In the case where the distance d between the first signal plane 6a and the second signal plane 6b is 25 µm and the refractive index n of the transparent medium filling the space between the first signal plane 6a and the second signal plane 6b is 1.57, the effect of the second signal plane 6b during a focusing operation with respect to the first signal plane 6a corresponds to the state where the defocus d/n=−16 µm in FIG. 31, and the effect of the first signal plane 6a during a focusing operation with respect to the second signal plane 6b corresponds to the state where the defocus d/n=16 µm in FIG. 31. Especially when the defocus d/n=16 µm, the focus error signal FE includes a non-negligible offset amount (an amplitude A in FIG. 31). Thus, accurate focusing with respect to a focus control plane is disturbed due to the effect of stray light from a plane located in proximity to a plane on which light is focused (such a plane hereinafter also referred to simply as "a proximity plane", and in this case, the first signal plane 6a is the proximity plane). As a result, accurate signal reading or writing cannot be performed.

Furthermore, a light spot formed by light from the second signal plane 6b during the focusing operation with respect to the first signal plane 6a corresponds to a light spot obtained by defocusing a light spot formed by light from the first signal plane 6a by −16 µm, and a light spot formed by light from the first signal plane 6a during the focusing operation with respect to the second signal plane 6b corresponds to a light spot obtained by defocusing a light spot formed by light from the second signal plane 6b by 16 µm. Therefore, assuming that the same amount of reflected light is detected from the first signal plane 6a and the second signal plane 6b during the focus control, the ratio of an amount of stray light from the second signal plane 6b to an amount of signal light from the first signal plane 6a during the focusing operation with respect to the first signal plane 6a corresponds to $A_1/A_0$, and the ratio of an amount of stray light from the first signal plane 6a to an amount of signal light from the second signal plane 6b during the focusing operation with respect to the second signal plane 6b corresponds to $A_2/A_0$. According to FIG. 31, these values fall within the range from 17% to 24%. The amount of stray light varies depending on the recording state of the proximity plane or the presence of an address pit, which makes accurate reading of a reproduction signal from the focus control plane difficult.

Moreover, in the case where signals are recorded on the second signal plane 6b, an amount of light passing through the first signal plane 6a varies depending on the recording state of the first signal plane 6a or the presence of an address pit, which causes the intensity of a light spot for recoding singles on the second signal plane 6b to vary, thereby making accurate signal writing difficult.

DISCLOSURE OF INVENTION

The present invention has been made to solve the above-described problems in the prior art. It is an object of the present invention to provide an optical disk device that can realize favorable recording/reproduction of signals on/from an optical disk having a plurality of signal planes arranged in proximity to each other.

In order to achieve the above object, an optical disk device according to a first configuration of the present invention includes: a light source; an objective lens for focusing light emitted from the light source on an optical disk; an optical splitter for diffracting the light reflected by the optical disk; and a photodetector on which the light diffracted by the optical splitter is focused. In this optical disk device, the optical splitter is divided into $n(n \geq 2)$ regions Ak(k=1, 2, . . . , n) by a straight line that intersects with an optical axis, the photodetector is divided into at least two regions A and A'. The light emitted from the light source is focused on any one of a plurality of signal planes of the optical disk by the objective lens. Light reflected from the signal plane on which the light emitted from the light source is focused (the focused plane) and light reflected from a signal plane located in proximity to the focused plane (a proximity plane) pass through the objective lens to turn into light beams a and a', respectively, that enter the optical splitter. 1st-order diffracted light beams ak and ak' having a common diffraction optical axis are derived from the light beams a and a' that have entered the regions Ak of the optical splitter, respectively, and are projected on the photodetector. Distributions of the 1st-order diffracted light beams ak and ak' on the photodetector are approximately inverted with respect to an intersection point of the diffraction optical axis and a detection plane, and the 1st-order diffracted light beam ak is approximately within the region A and the 1st-order diffracted light beam ak' is approximately within the region A'.

In the optical disk device according to the first configuration of the present invention, it is preferable that the photodetector has at least two regions B and B' in addition to the regions A and A', −1st-order diffracted light beams bk and bk' having a common diffraction optical axis are derived from the light beams a and a' that have entered the regions Ak of the optical splitter, respectively, and are projected on the photodetector, distributions of the −1st-order diffracted light beams bk and bk' on the photodetector are similar to each other with respect to the intersection point of the diffraction optical axis and the detection plane, and the −1st-order diffracted light beams bk and bk' are both approximately within the region B. In this case, it is preferable that, where SA denotes a signal detected in the region A, SA' denotes a signal detected in the region A', SB denotes a signal detected in the region B, and SB' denotes a signal detected in the region B', when the light emitted from the light source is focused on a first signal plane of the optical disk, the signal SA is regarded as a reproduction signal that is reproduced from the first signal plane (the focused plane) and the signal SA is regarded as a reflected signal from a second signal plane (a proximity plane), and when the light emitted from the light source is focused on the second signal plane of the optical disk, the signal SB is regarded as a reproduction signal that is reproduced from the second signal plane (the focused plane) and the signal SB' is regarded as a reflected signal from the first signal plane (the proximity plane). In this case, it is preferable that where SA denotes a signal detected in the region A, SA' denotes a signal detected in the region A', SB denotes a signal detected in the region B, and SB' denotes a signal detected in the region B', a signal SA+SB−SA'−SB' is regarded as a reproduction signal that is reproduced from the signal plane on which the light emitted from the light source is focused (the focused plane) and a signal SA'+SB' is regarded as a reflected signal from a signal plane located in proximity to the focused plane (a proximity plane). In this case, it is preferable that, when the proximity plane is on a side closer to the objective lens with respect to the focused plane, an amount of light emitted from the light source is controlled in accordance with the reflected signal from the proximity plane. In this case, it is preferable that a portion of the photodetector that includes the regions A and B and does not include the regions A' and B' is divided further into a plurality of regions, and a focus error signal that indicates an error in focusing with respect to the optical disk is generated by calculating signals detected in the plurality of regions.

Furthermore, an optical disk device according to a second configuration of the present invention includes: a light source, an objective lens for focusing light emitted from the light source on an optical disk; an optical splitter for diffracting the light reflected by the optical disk; and a photodetector on which the light diffracted by the optical splitter is focused. In this optical disk device, the optical splitter is divided into $n(n \geq 2)$ regions $Bk(k=1, 2, \ldots, n)$ by a straight line that intersects with an optical axis, the photodetector is divided into at least two regions B and B', the light emitted from the light source is focused on any one of a plurality of signal planes of the optical disk by the objective lens, light reflected from the signal plane on which the light emitted from the light source is focused (the focused plane) and light reflected from a signal plane located in proximity to the focused plane (a proximity plane) pass through the objective lens to turn into light beams b and b', respectively, that enter the optical splitter, −1st-order diffracted light beams bk and bk' having a common diffraction optical axis are derived from the light beams b and b' that have entered the regions Bk of the optical splitter, respectively, and are projected on the photodetector, distributions of the −1st-order diffracted light beams bk and bk' on the photodetector are approximately inverted with respect to an intersection point of the diffraction optical axis and a detection plane, and the −1st-order diffracted light beam bk is approximately within the region B and the −1st-order diffracted light beam bk' is approximately within the region B'.

In the optical disk device according to the second configuration of the present invention, it is preferable that the photodetector has at least two regions A and A' in addition to the regions B and B', 1st-order diffracted light beams ak and ak' having a common diffraction optical axis are derived from the light beams b and b' that have entered the regions Bk of the optical splitter, respectively, and are projected on the photodetector, distributions of the 1st-order diffracted light beams ak and ak' on the photodetector are similar to each other with respect to the intersection point of the diffraction optical axis and the detection plane, and the 1st-order diffracted light beams ak and ak' are both approximately within the region A. In this case, it is preferable that, where SA denotes a signal detected in the region A, SA' denotes a signal detected in the region A', SB denotes a signal detected in the region B, and SB' denotes a signal detected in the region B', when the light emitted from the light source is focused on a first signal plane of the optical disk, the signal SA is regarded as a reproduction signal that is reproduced from the first signal plane (the focused plane) and the signal SA' is regarded as a reflected signal from a second signal plane (a proximity plane), and when the light emitted from the light source is focused on the second signal plane of the optical disk, the signal SB is regarded as a reproduction signal that is reproduced from the second signal plane (the focused plane) and the signal SB' is regarded as a reflected signal from the first signal plane (the proximity plane). In this case, it is preferable that where SA denotes a signal detected in the region A, SA' denotes a signal detected in the region A', SB denotes a signal detected in the region B, and SB' denotes a signal detected in the region B', a signal SA+SB'−SA'−SB' is regarded as a reproduction signal that is reproduced from the signal plane on which the light emitted from the light source is focused (the focused plane) and a signal SA'+SB' is regarded as a reflected signal from a signal plane located in proximity to the focused plane (a proximity plane). In this case, it is preferable that, when the proximity plane is on a side closer to the objective lens with respect to the focused plane, an amount of light emitted from the light source is controlled in accordance with the reflected signal from the proximity plane. In this case, it is preferable that a portion of the photodetector that includes the regions A and B and does not include the regions A' and B' is divided further into a plurality of regions, and a focus error signal that indicates an error in focusing with respect to the optical disk is generated by calculating signals detected in the plurality of regions.

With the configurations of the present invention, it is possible to cancel stray light components from a proximity plane(s) in an optical disk that has a plurality of signal planes arranged in proximity to each other. Therefore, regardless of the recording state of the proximity plane(s) or the presence of an address pit, accurate reading of a reproduction signal from a focus control plane becomes possible. Moreover, it is possible to detect the amount of stray light from the proximity plane(s). Thus, when signals are recorded on the second signal plane, it is possible to control an intensity of a light spot for recoding signals on the second signal plane so as to allow accurate signal writing on the second signal plane by estimating an amount of light passing through the first signal plane and controlling an output from the light source based on this estimate value. Furthermore, it is also possible to cancel stray light components from a proximity plane(s) in the detection of a focus signal. Thus, focus control that is not affected by the proximity plane(s) becomes possible.

BRIEF DESCRIPTION OF DRAWINGS

FIG. 10 shows a photodetection pattern formed on a photodetector that is used in the optical disk device according to the second embodiment of the present invention and light distribution on the photodetector.

FIG. 22 shows a photodetection pattern formed on a photodetector that is used in the optical disk device according to the fifth embodiment of the present invention and light distribution on the photodetector in the state shown in FIG. 20.

FIG. 24 shows a photodetection pattern formed on the photodetector that is used in the optical disk device according to the fifth embodiment of the present invention and light distribution on the photodetector in the state shown in FIG. 23.

FIG. 25 shows the relationship between a light spot and a parting line on a photodetection plane when there is an alignment error.

BEST MODE FOR CARRYING OUT THE INVENTION

Hereinafter, the present invention will be described more specifically by way of embodiments.

First Embodiment

Figure 1:
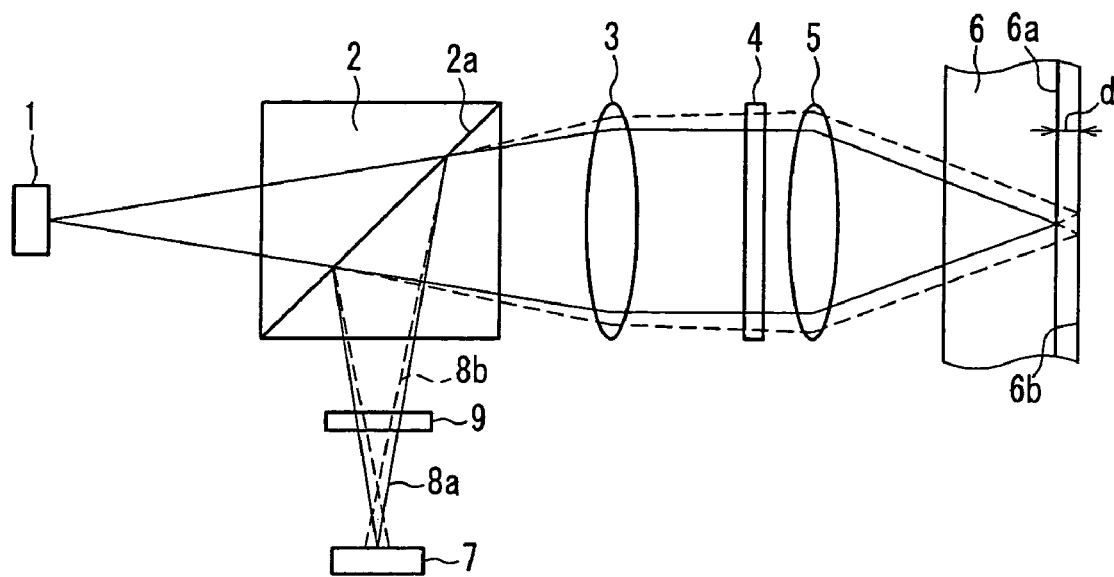
FIG. 1 is a schematic cross-sectional view showing an optical disk device according to a first embodiment of the present invention (in the case where a focal point of an objective lens is on a first signal plane of an optical disk).
Figure 2:
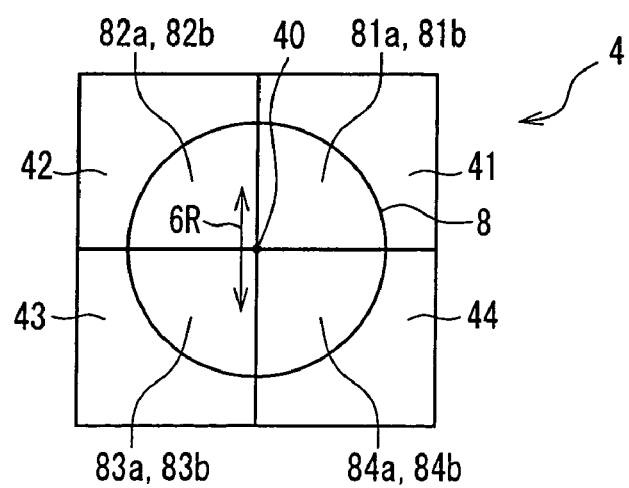
FIG. 2 shows a hologram pattern formed on a hologram that serves as an optical splitter in the optical disk device according to the first embodiment of the present invention.
Figure 3:
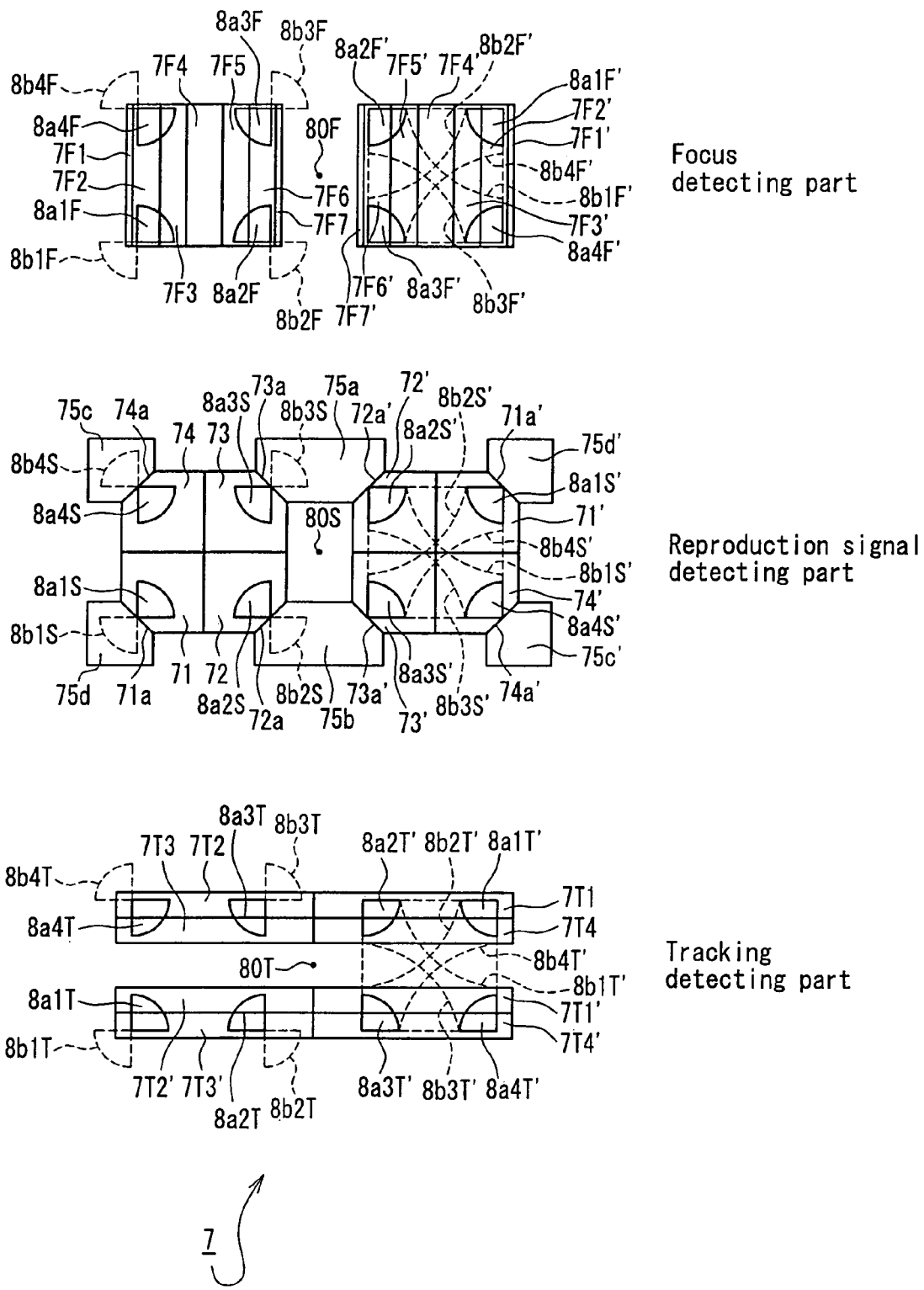
FIG. 3 shows a photodetection pattern formed on a photodetector that is used in the optical disk device according to the first embodiment of the present invention and light distribution on the photodetector in the state shown in FIG. 1.
Figure 4:
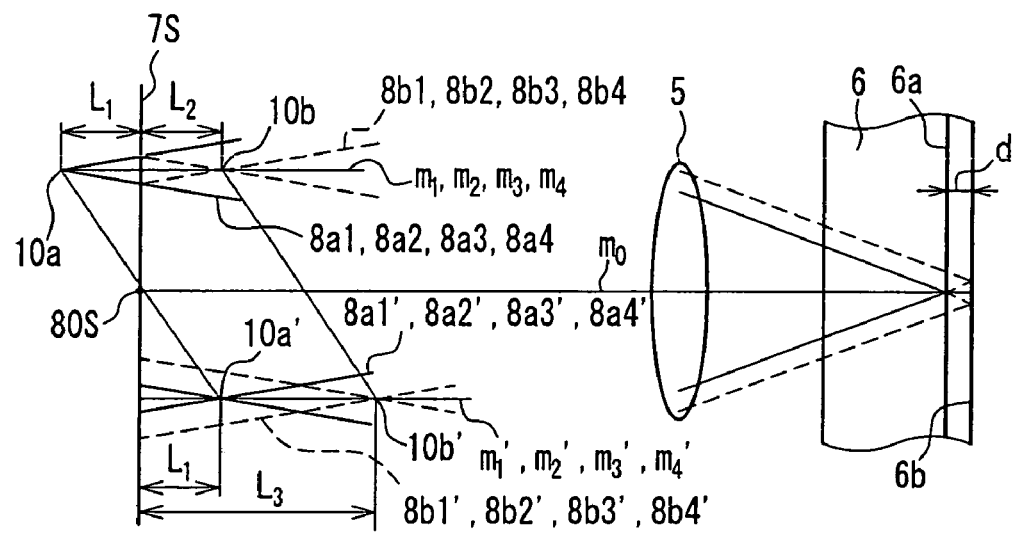
FIG. 4 illustrates positions of focal points of returned lights located on the front side and the back side of the photodetector in the cross-section taken along an optical axis of the optical disk device in the state shown in FIG. 1.

FIG. 1 is a schematic cross-sectional view showing an optical disk device according to a first embodiment of the present invention (in the state where a focal point of an objective lens is on a first signal plane of an optical disk). FIG. 2 shows a hologram pattern formed on a hologram that serves as an optical splitter in the optical disk device. FIG. 3 shows a photodetection pattern formed on a photodetector that is used in the optical disk device and light distribution on the photodetector in the state shown in FIG. 1. FIG. 4 illustrates positions of focal points of returned lights (0th-order diffracted light beams resulting from the diffraction by a diffraction grating) located on the front side and the back side of the photodetector in the cross-section taken along an optical axis of the optical disk device in the state shown in FIG. 1. The elements common to the optical disk device of the present embodiment and the conventional optical disk device are indicated with the same numerals and characters as those used for describing the conventional optical disk device.

As shown in FIG. 1, the optical disk device of the present embodiment includes a light source 1, a collimator lens 3 for converting light emitted from the light source 1 into parallel light, an objective lens 5 for focusing the parallel light on an optical disk, a hologram 4 for diffracting the light reflected by the optical disk (i.e., returned light), a beam splitter 2 for bending a light path of the returned light that has passed through the hologram 4 and then the collimator lens 3, a diffraction grating 9 for diffracting the returned light whose light path has been bent by the beam splitter 2, and a photodetector 7 on which the returned light that has been diffracted by the diffraction grating 9 is focused in a diffused state.

The optical disk includes a substrate 6 made of a transparent material, a semi-transparent first signal plane 6a formed on a surface of the substrate 6, and a second signal plane 6b formed in proximity to the first signal plane 6a on the back side of the first signal plane 6a (i.e., on the side farther from the objective lens 5). The distance d between the first signal plane 6a and the second signal plane 6b generally is about 20 to several tens μm, and a transparent medium having a refractive index n(n=about 1.5) fills a space between the first signal plane 6a and the second signal plane 6b.

As shown in FIG. 2, the hologram 4 is divided into four equal parts, namely, a first quadrant 41, a second quadrant 42, a third quadrant 43, and a fourth quadrant 44, by straight lines that intersect with each other at an intersection point 40 of the optical axis and a surface of the hologram 4. A pattern is formed in each of these four regions.

As shown in FIG. 3, the photodetector 7 includes a reproduction signal detecting part, a focus detecting part, and a tracking detecting part. The reproduction signal detecting part includes detector cells 71, 72, 73, and 74, detector cells 71', 72', 73', and 74' that are arranged to be axisymmetrical to these detector cells 71, 72, 73, and 74, and detector cells 75a, 75b, 75c, 75d, 75c', and 75d' that are provided for the purpose of detecting stray light only and located outside the detector cells 71, 72, 73, 74, 71', 72', 73', and 74' so as to be adjacent thereto. The focus detecting part includes detector cells 7F1, 7F2, 7F3, 7F4, 7F5, 7F6, and 7F7 and detector cells 7F1', 7F2', 7F3', 7F4', 7F5', 7F6', and 7F7' that are arranged to be axisymmetrical to these detector cells 7F1, 7F2, 7F3, 7F4, 7F5, 7F6, and 7F7. The tracking detecting part includes detector cells 7T1, 7T2, 7T3, and 7T4 and detector cells 7T1', 7T2', 7T3', and 7T4' that are similar in shape to the detector cells 7T1, 7T2, 7T3, and 7T4.

As shown in FIG. 1, light emitted from the light source 1 passes through the beam splitter 2 and is converged by the collimator lens 3 to turn into parallel light. After passing through the hologram 4, the parallel light is focused on the first signal plane 6a of the optical disk by the objective lens 5 (the light path is indicated with a solid line). Returned light 8a, which is the light reflected by the first signal plane 6a, is converged by the objective lens 5 and enters the hologram 4 to be diffracted by the hologram 4. The returned light 8a diffracted by the hologram 4 then is converged by the collimator lens 3 and is reflected by a split plane 2a of the beam splitter 2, whereby the light path of the returned light 8a is bent. The returned light 8a whose light path has been bent is diffracted further by the diffraction grating 9 in directions different from those in which the returned light 8a has been diffracted by the hologram 4 and then is focused on the photodetector 7 in a diffused state (the light path of a 0th-order diffracted light beam resulting from the diffraction by the hologram 4 and the diffraction grating 9 is indicated with a solid line).

The first signal plane 6a of the optical disk is semi-transparent. Thus, among light focused on the first signal plane 6a, light passing through the first signal plane 6a reaches the second signal plane 6b. Then, returned light 8b, which is the light reflected by the second signal plane 6b, passes through the first signal plane 6a again, is converged by the objective lens 5, and enters the hologram 4 to be diffracted by the hologram 4. The returned light 8b diffracted by the hologram 4 then is converged by the collimator lens 3 and is reflected by the split plane 2a of the beam splitter 2, whereby the light path of the returned light 8b is bent. The returned light 8b whose light path has been bent is diffracted further by the diffraction grating 9 in directions different from those in which the returned light 8b has been diffracted by the hologram 4 and then is focused on the photodetector 7 in a diffused state (the light path of a 0th-order diffracted light beam resulting from the diffraction by the hologram 4 and the diffraction grating 9 is indicated with a dashed line). Note here that the focal point of the returned light 8b is on the front side of the focal point of the returned light 8a (i.e., on the side closer to the beam splitter 2).

Light reflected by the optical disk, i.e., returned light 8, is divided equally (or substantially equally) into four light beams, namely, a first quadrant light beam 81a (or 81b), a second quadrant light beam 82a (or 82b), a third quadrant light beam 83a (or 83b), and a fourth quadrant light beam 84a (or 84b) by the first quadrant 41 to the fourth quadrant 44, respectively, where the first quadrant light beam 81a to the fourth quadrant light beam 84a refer to the light beams derived from the returned light 8a that is reflected by a signal plane on/from which signals are recorded/reproduced (in this case, the first signal plane 6a) and enters the first quadrant 41 to the fourth quadrant 44 of the hologram 4, respectively, and the first quadrant light beam 81b to the fourth quadrant light beam 84b, refer to the light beams derived from the returned light 8b that is reflected by a signal plane on/from which signals are not recorded/reproduced (in this case, the second signal plane 6b) and enters the first quadrant 41 to the fourth quadrant 44 of the hologram 4, respectively. These quadrant light beams are diffracted in the respective quadrants. The hologram 4 achieves a diffraction efficiency of about 0% for a 0th-order light beam and a diffraction efficiency of about 40% for ±1st-order light beams, for example.

With regard to both the returned lights 8a and 8b, a 0th-order diffraction component of light diffracted by the diffraction grating 9 (i.e., a component that passes through the diffraction grating 9 without being diffracted) is projected on the reproduction signal detecting part of the photodetector 7, a 1st-order diffraction component of the same is projected on the focus detecting part of the photodetector 7, and a −1st-order diffraction component of the same is projected on the tracking detecting part of the photodetector 7. The light distributions of these components are similar to each other. More specifically, the light distributions of the ±1st-order diffraction components correspond to light distributions obtained by shifting the light distribution of the 0th-order diffraction component. The diffraction grating 9 achieves a diffraction efficiency of about 80% for a 0th-order light beam and a diffraction efficiency of about 5% for ±1st-order light beams, for example.

When the returned light 8a is projected on the reproduction signal detecting part of the photodetector 7, a point 80S shown in FIG. 3 is a position where, with regard to 0th-order diffracted light beams derived from the first quadrant light beam 81a, the second quadrant light beam 82a, the third quadrant light beam 83a, and the fourth quadrant light beam 84a that have passed through the hologram 4, 0th-order components that have passed through the diffraction grating 9 are focused. A 0th-order component passing through the diffraction grating 9 of a 1st-order diffracted light beam 8a1 derived from the first quadrant light beam 81a forms a light spot 8a1S within the detector cell 71, a 0th-order component passing through the diffraction grating 9 of a −1st-order diffracted light beam 8a1' derived from the first quadrant light beam 81a forms a light spot 8a1S' within the detector cell 71', a 0th-order component passing through the diffraction grating 9 of a 1st-order diffracted light beam 8a2 derived from the second quadrant light beam 82a forms a light spot 8a2S within the detector cell 72, a 0th-order component passing through the diffraction grating 9 of a −1st-order diffracted light beam 8a2' derived from the second quadrant light beam 82a forms a light spot 8a2S'within the detector cell 72', a 0th-order component passing through the diffraction grating 9 of a 1st-order diffracted light beam 8a3 derived from the third quadrant light beam 83a forms a light spot 8a3S within the detector cell 73, a 0th-order component passing through the diffraction grating 9 of a −1st-order diffracted light beam 8a3' derived from the third quadrant light beam 83a forms a light spot 8a3S' within the detector cell 73', a 0th-order component passing through the diffraction grating 9 of a 1st-order diffracted light beam 8a4 derived from the fourth quadrant light beam 84a forms a light spot 8a4S within the detector cell 74, and a 0th-order component passing through the diffraction grating 9 of a −1st-order diffracted light beam 8a4' derived from the fourth quadrant light beam 84a forms a light spot 8a4S' within the detector cell 74' (the respective light spots are indicated with solid lines).

When the returned light 8b is projected on the reproduction signal detecting part of the photodetector 7, a 0th-order component passing through the diffraction grating 9 of a 1st-order diffracted light beam 8b1 derived from the first quadrant light beam 81b forms a light spot 8b1S within the detector cell 75d, a 0th-order component passing through the diffraction grating 9 of a −1st-order diffracted light beam 8b 1' derived from the first quadrant light beam 81b forms a light spot 8b1S' that extends within the detector cells 71', 72', 73', and 74', a 0th-order component passing through the diffraction grating 9 of a 1st-order diffracted light beam 8b2 derived from the second quadrant light beam 82b forms a light spot 8b2S within the detector cell 75b, a 0th-order component passing through the diffraction grating 9 of a −1st-order diffracted light beam 8b2' derived from the second quadrant light beam 82b forms a light spot 8b2S' that extends within the detector cells 71', 72', 73', and 74', a 0th-order component passing through the diffraction grating 9 of a 1st-order diffracted light beam 8b3 derived from the third quadrant light beam 83b forms a light spot 8b3S within the detector cell 75a, a 0th-order component passing through the diffraction grating 9 of a −1st-order diffracted light beam 8b3' derived from the third quadrant light beam 83b forms a light spot 8b3S' that extends within the detector cells 71', 72', 73', and 74', a 0th-order component passing through the diffraction grating 9 of a 1st-order diffracted light beam 8b4 derived from the fourth quadrant light beam 84b forms a light spot 8b4S within the detector cell 75c, and a 0th-order component passing through the diffraction grating 9 of a −1st-order diffracted light beam 8b4' derived from the fourth quadrant light beam 84b forms a light spot 8b4S' that extends within the detector cells 71', 72', 73', and 74' (the respective light spots are indicated with dashed lines).

As shown in FIG. 4, the 0th-order components passing through the diffraction grating 9 of the 1st-order diffracted light beams 8a1 and 8b1, the 0th-order components passing through the diffraction grating 9 of the 1st-order diffracted light beams 8a2 and 8b2, the 0th-order components passing through the diffraction grating 9 of the 1st-order diffracted light beams 8a3 and 8b3, the 0th-order components passing through the diffraction grating 9 of the 1st-order diffracted light beams 8a4 and 8b4, the 0th-order components passing through the diffraction grating 9 of the −1st-order diffracted light beams 8a1' and 8b1', the 0th-order components passing through the diffraction grating 9 of the −1st-order diffracted light beams 8a2' and 8b2', the 0th-order components passing through the diffraction grating 9 of the −1st-order diffracted light beams 8a3'and 8b3', and the 0th-order components passing through the diffraction grating 9 of the −1st-order diffracted light beams 8a4' and 8b4' have common diffraction optical axes $m_1$, $m_2$, $m_3$, $m_4$, $m_1'$, $m_2'$, $m_3'$, and $m_4'$, respectively.

As shown in FIGS. 3 and 4, the diffraction optical axes $m_1$, $m_2$, $m_3$, and $m_4$ intersect with the detection plane 7S of the photodetector 7 in the vicinity of (e.g., within a distance corresponding to $\frac{1}{10}$ of the spot size) the boundary 71a between the detector cell 71 and the detector cell 75d, the boundary 72a between the detector cell 72 and the detector cell 75b, the boundary 73a between the detector cell 73 and the detector cell 75a, and the boundary 74a between the detector cell 74 and the detector cell 75c, respectively. Furthermore, the diffraction optical axes $m_1'$, $m_2'$, $m_3'$, and $m_4'$ intersect with the detection plane 7S of the photodetector 7 in the vicinity of (e.g., within a distance corresponding to $\frac{1}{10}$ of the spot size) the boundary 71a' between the detector cell 71' and the detector cell 75d', the boundary 72a' between the detector cell 72'and the detector cell 75b, the boundary 73a' between the detector cell 73' and the detector cell 75a, and the boundary 74a' between the detector cell 74' and the detector cell 75c', respectively.

As shown in FIG. 4, with regard to the returned light 8a diffracted by the hologram 4, the 0th-order components passing through the diffraction grating 9 of the 1st-order diffracted light beams 8a1, 8a2, 8a3, and 8a4 diffracted in the first quadrant 41 to the fourth quadrant 44, respectively, are focused on a position located at a distance L1 from the detection plane 7S on the back side thereof. In contrast, with regard to the returned light 8b diffracted by the hologram 4, the 0th-order components passing through the diffraction grating 9 of the 1st-order diffracted light beams 8b1, 8b2, 8b3, and 8b4 diffracted in the first quadrant 41 to the fourth quadrant 44, respectively, are focused on a position located at a distance L2 from the detection plane 7S on the front side thereof (note here that the distance L2 is approximately equal to the distance L1). Therefore, as shown in FIG. 3, the positional relationships between the light spots 8a1S and 8b1S formed by the 0th-order components passing through the diffraction grating 9 of the 1st-order diffracted light beams 8a1 and 8b1, between the light spots 8a2S and 8b2S formed by the 0th-order components passing through the diffraction grating 9 of the 1st-order diffracted light beam 8a2 and 8b2, between the light spots 8a3S and 8b3S formed by the 0th-order components passing through the diffraction grating 9 of the 1st-order diffracted light beam 8a3 and 8b3, and between the light spots 8a4S and 8b4S formed by the 0th-order components passing through the diffraction grating 9 of the 1st-order diffracted light beam 8a4 and 8b4 are such that they are symmetrical with respect to the intersection points of the respective diffraction optical axes $m_1$, $m_2$, $m_3$, and $m_4$ with the detection plane 7S (which are in the vicinity of the boundaries 71a, 72a, 73a, and 74a, respectively).

Furthermore, as shown in FIG. 4, with regard to the returned light 8a diffracted by the hologram 4, the 0th-order components passing through the diffraction grating 9 of the −1st-order diffracted light beams 8a1', 8a2', 8a3' and 8a4' diffracted in the first quadrant 41 to the fourth quadrant 44, respectively, are focused on a position located at a distance L1 from the detection plane 7S on the front side thereof. In contrast, with regard to the returned light 8b diffracted by the hologram 4, the 0th-order components passing through the diffraction grating 9 of the −1st-order diffracted light beams 8$b$1', 8$b$2', 8$b$3', and 8$b$4' diffracted in the first quadrant 41 to the fourth quadrant 44, respectively, are focused on a position located at a distance L3 from the detection plane 7S on the front side thereof (note here that L3−L1=L1+L2). Therefore, as shown in FIG. 3, the light spots 8$b$1S', 8$b$2S', 8$b$3S', and 8$b$4S' correspond to light spots obtained by enlarging the light spots 8$a$1S', 8$a$2S', 8$a$3S', and 8$a$4S' about three times with the intersection points of the respective diffraction optical axes $m_1'$, $m_2'$, $m_3'$, and $m_4'$ with the detection plane 7S (i.e., the positions corresponding to the axes of the respective sectors) being fixed.

When the returned light 8$a$ is projected on the focus detecting part of the photodetector 7, a point 80F shown in FIG. 3 is a position where, with regard to the 0th-order diffracted light beams derived from the first quadrant light beam 81$a$, the second quadrant light beam 82$a$, the third quadrant light beam 83$a$, and the fourth quadrant light beam 84$a$ that have passed through the hologram 4, 1st-order components that have been diffracted by the diffraction grating 9 are focused. A 1st-order component diffracted by the diffraction grating 9 of the 1st-order diffracted light beam 8$a$1 derived from the first quadrant light beam 81$a$ forms a light spot 8$a$1F. A 1st-order component diffracted by the diffraction grating 9 of the −1st-order diffracted light beam 8$a$1' derived from the first quadrant light beam 81$a$ forms a light spot 8$a$1F'. A 1st-order component diffracted by the diffraction grating 9 of the 1st-order diffracted light beam 8$a$2 derived from the second quadrant light beam 82$a$ forms a light spot 8$a$2F. A 1st-order component diffracted by the diffraction grating 9 of the −1st-order diffracted light beam 8$a$2' derived from the second quadrant light beam 82$a$ forms a light spot 8$a$2F'. A 1st-order component diffracted by the diffraction grating 9 of the 1st-order diffracted light beam 8$a$3 derived from the third quadrant light beam 83$a$ forms a light spot 8$a$3F. A 1st-order component diffracted by the diffraction grating 9 of the −1st-order diffracted light beam 8$a$3' derived from the third quadrant light beam 83$a$ forms a light spot 8$a$3F'. A 1st-order component diffracted by the diffraction grating 9 of the 1st-order diffracted light beam 8$a$4 derived from the fourth quadrant light beam 84$a$ forms a light spot 8$a$4F. A 1st-order component diffracted by the diffraction grating 9 of the −1st-order diffracted light beam 8$a$4' derived from the fourth quadrant light beam 84$a$ forms a light spot 8$a$4F' (the respective light spots are indicated with solid lines).

When the returned light 8$b$ is projected on the focus detecting part of the photodetector 7, a 1st-order component diffracted by the diffraction grating 9 of the 1st-order diffracted light beam 8$b$ 1 derived from the first quadrant light beam 81$b$ forms a light spot 8$b$1F. A 1st-order component diffracted by the diffraction grating 9 of the −1st-order diffracted light beam 8$b$1' derived from the first quadrant light beam 81$b$ forms a light spot 8$b$1F'. A 1st-order component diffracted by the diffraction grating 9 of the 1st-order diffracted light beam 8$b$2 derived from the second quadrant light beam 82$b$ forms a light spot 8$b$2F. A 1st-order component diffracted by the diffraction grating 9 of the −1st-order diffracted light beam 8$b$2' derived from the second quadrant light beam 82$b$ forms a light spot 8$b$2F'. A 1st-order component diffracted by the diffraction grating 9 of the 1st-order diffracted light beam 8$b$3 derived from the third quadrant light beam 83$b$ forms a light spot 8$b$3F. A 1st-order component diffracted by the diffraction grating 9 of the −1st-order diffracted light beam 8$b$3' derived from the third quadrant light beam 83$b$ forms a light spot 8$b$3F'. A 1st-order component diffracted by the diffraction grating 9 of the 1st-order diffracted light beam 8$b$4 derived from the fourth quadrant light beam 84$b$ forms a light spot 8$b$4F. A 1st-order component diffracted by the diffraction grating 9 of the −1st-order diffracted light beam 8$b$4' derived from the fourth quadrant light beam 84$b$ forms a light spot 8$b$4F' (the respective light spots are indicated with dashed lines).

When the returned light 8$a$ is projected on the tracking detecting part of the photodetector 7, a point 80T shown in FIG. 3 is a position where, with regard to the 0th-order diffracted light beams derived from the first quadrant light beam 81$a$, the second quadrant light beam 82$a$, the third quadrant light beam 83$a$, and the fourth quadrant light beam 84$a$ that have passed through the hologram 4, −1st-order components diffracted by the diffraction grating 9 are focused. A −1st-order component diffracted by the diffraction grating 9 of the 1st-order diffracted light beam 8$a$1 derived from the first quadrant light beam 81$a$ forms a light spot 8$a$1T. A −1st-order component diffracted by the diffraction grating 9 of the −1st-order diffracted light beam 8$a$1' derived from the first quadrant light beam 81$a$ forms a light spot 8$a$1T'. A −1st-order component diffracted by the diffraction grating 9 of the 1st-order diffracted light beam 8$a$2 derived from the second quadrant light beam 82$a$ forms a light spot 8$a$2T. A −1st-order component diffracted by the diffraction grating 9 of the −1st-order diffracted light beam 8$a$2' derived from the second quadrant light beam 82$a$ forms a light spot 8$a$2T'. A −1st-order component diffracted by the diffraction grating 9 of the 1st-order diffracted light beam 8$a$3 derived from the third quadrant light beam 83$a$ forms a light spot 8$a$3T. A −1st-order component diffracted by the diffraction grating 9 of the −1st-order diffracted light beam 8$a$3' derived from the third quadrant light beam 83$a$ forms a light spot 8$a$3T'. A −1st-order component diffracted by the diffraction grating 9 of the 1st-order diffracted light beam 8$a$4 derived from the fourth quadrant light beam 84$a$ forms a light spot 8$a$4T. A −1st-order component diffracted by the diffraction grating 9 of the −1st-order diffracted light beam 8$a$4' derived from the fourth quadrant light beam 84$a$ forms a light spot 8$a$4T' (the respective light spots are indicated with solid lines).

When the returned light 8$b$ is projected on the tracking detecting part of the photodetector 7, a −1st-order component diffracted by the diffraction grating 9 of the 1st-order diffracted light beam 8$b$1 derived from the first quadrant light beam 81$b$ forms a light spot 8$b$1T. A −1st-order component diffracted by the diffraction grating 9 of the −1st-order diffracted light beam 8$b$1' derived from the first quadrant light beam 81$b$ forms a light spot 8$b$1T'. A −1st-order component diffracted by the diffraction grating 9 of the 1st-order diffracted light beam 8$b$2 derived from the second quadrant light beam 82$b$ forms a light spot 8$b$2T. A −1st-order component diffracted by the diffraction grating 9 of the −1st-order diffracted light beam 8$b$2' derived from the second quadrant light beam 82$b$ forms a light spot 8$b$2T'. A −1st-order component diffracted by the diffraction grating 9 of the 1st-order diffracted light beam 8$b$3 derived from the third quadrant light beam 83$b$ forms a light spot 8$b$3T. A −1st-order component diffracted by the diffraction grating 9 of the −1st-order diffracted light beam 8$b$3' derived from the third quadrant light beam 83$b$ forms a light spot 8$b$3T'. A −1st-order component diffracted by the diffraction grating 9 of the 1st-order diffracted light beam 8$b$4 derived from the fourth quadrant light beam 84$b$ forms a light spot 8$b$4T. A −1st-order component diffracted by the diffraction grating 9 of the −1st-order diffracted light beam 8$b$4' derived from the fourth quadrant light beam 84$b$ forms a light spot 8$b$4T' (the respective light spots are indicated with dashed lines).

Figure 5:
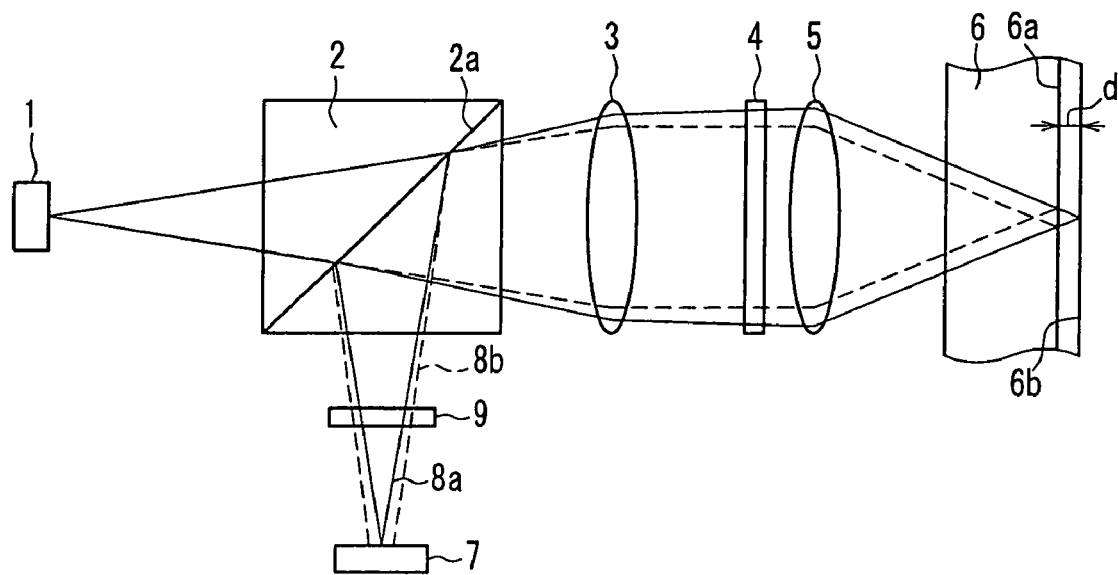
FIG. 5 is a schematic cross-sectional view showing the optical disk device according to the first embodiment of the present invention (in the case where a focal point of the objective lens is on a second signal plane of the optical disk).
Figure 6:
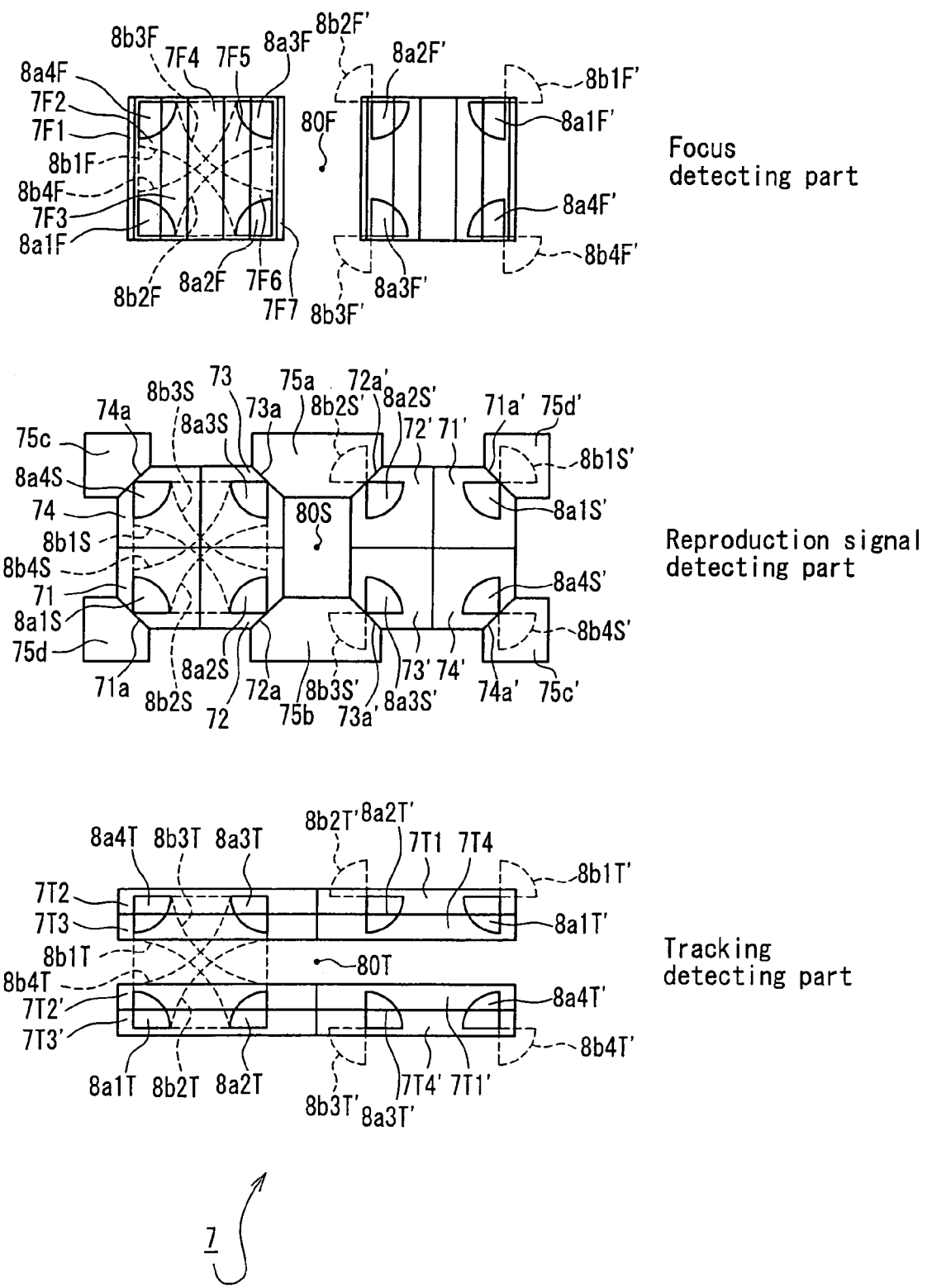
FIG. 6 shows a photodetection pattern formed on the photodetector that is used in the optical disk device according to the first embodiment of the present invention and light distribution on the photodetector in the state shown in FIG. 5.

FIG. 5 shows the optical disk device in the case where a focal point of the objective lens 5 is on the second signal plane 6b of the optical disk (i.e., a signal plane on/from which signals are recorded/reproduced is the second signal plane 6b) and the focal point of the returned light 8b is on the back side of the focal point of returned light 8a (i.e., on the side farther from the beam splitter 2). FIG. 6 shows a photodetection pattern formed on the photodetector and light distribution on the photodetector in the optical disk device shown in FIG. 5, and FIG. 7 illustrates positions of focal points of returned lights (0th-order diffracted light beam resulting from the diffraction by the diffraction grating) located on the front side and the back side of the photodetector in the cross-section taken along the optical axis of the optical disk device shown in FIG. 5.

As shown in FIG. 5, a part of the light focused on the second signal plane 6b does not reach the second signal plane 6b and is reflected by the first signal plane 6a to be returned light 8b. The returned light 8b is converged by the objective lens 5 and enters the hologram 4 to be diffracted by the hologram 4. The returned light 8b diffracted by the hologram 4 then is converged by the collimator lens 3 and is reflected by a split plane 2a of the beam splitter 2, whereby the light path of the returned light 8b is bent. The returned light 8a whose light path has been bent is diffracted further by the diffraction grating 9 in directions different from those in which the returned light 8a has been diffracted by the hologram 4 and then is focused on the photodetector 7 in a diffused state (the light path of a 0th-order diffracted light beam resulting from the diffraction by the hologram 4 and the diffraction grating 9 is indicated with a dashed line.). Note here that the focal point of the returned light 8b from the signal plane on/from which signals are not recorded/reproduced (in this case, the first signal plane 6a) is on the back side of the focal point of the returned light 8a (i.e., on the side farther from the beam splitter 2).

Points 80S, 80F, and 80T shown in FIG. 6 are positions where 0th-, 1st-, and −1st-order components diffracted by the diffraction grating 9 of 0th-order diffracted light beams derived from the first quadrant light beam 81a, the second quadrant light beam 82a, the third quadrant light beam 83a, and the fourth quadrant light beam 84a are focused, respectively, as in the case of FIG. 3. The portions where the respective light spots are projected and the shapes of the light spots projected on the reproduction signal detecting part, the focus detecting part, and the tracking detecting part of the photodetector 7 with regard to the returned light 8a are the same as those shown in FIG. 3. However, with regard to the returned light 8b, the shapes of the light spots projected on the reproduction signal detecting part correspond to a pattern obtained by inverting the shapes of the light spots shown in FIG. 3 with respect to the point 80S. Furthermore, with regard to the returned light 8b, the shapes of the light spots projected on the focus signal detecting part correspond to a pattern obtained by inverting the shapes of the light spots shown in FIG. 3 with respect to the point 80F. Still further, with regard to the returned light 8b, the shapes of the light spots projected on the tracking signal detecting part correspond to a pattern obtained by inverting the shapes of the light spots shown in FIG. 3 with respect to the point 80T.

Figure 7:
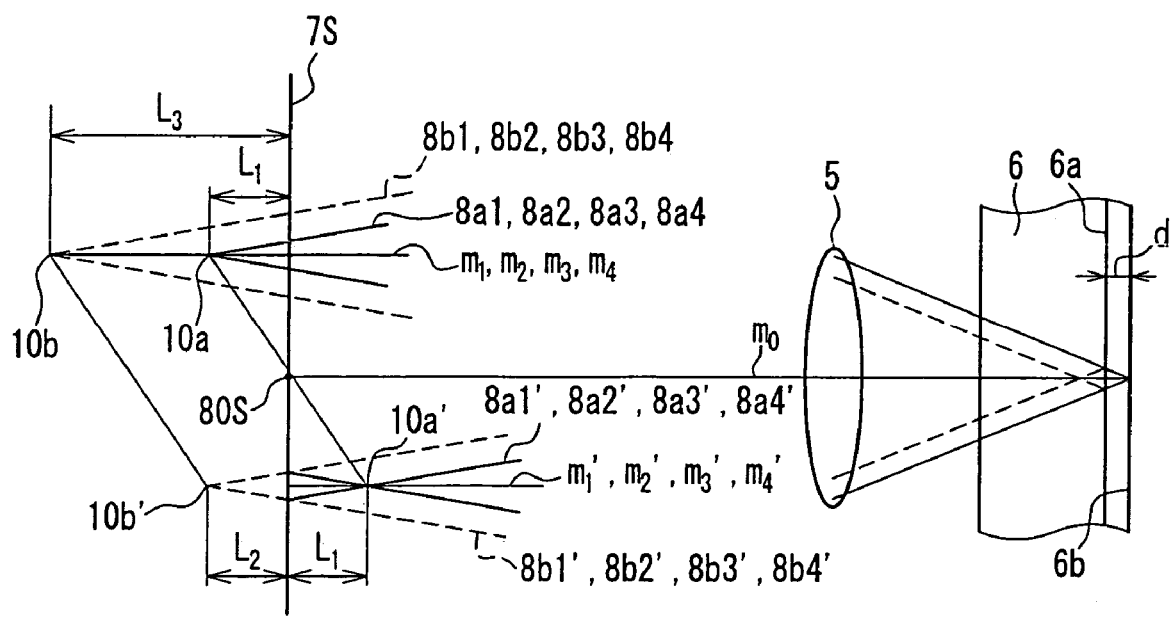
FIG. 7 illustrates positions of focal points of returned lights located on the front side and the back side of the photodetector in the cross-section taken along an optical axis of the optical disk device in the state shown in FIG. 5.

As shown in FIG. 7, with regard to the returned light 8a diffracted by the hologram 4, 0th-order components passing through the diffraction grating 9 of −1st-order diffracted light beams 8a1', 8a2', 8a3', and 8a4' diffracted in the first quadrant 41 to the fourth quadrant 44, respectively, are focused on a position located at a distance L1 from the detection plane 7S on the front side thereof. In contrast, with regard to the returned light 8b diffracted by the hologram, 0th-order components passing through the diffraction grating 9 of 1st-order diffracted light beams 8b1', 8b2', 8b3', and 8b4' diffracted in the first quadrant 41 to the fourth quadrant 44, respectively, are focused on a position located at a distance L2 from the detection plane 7S on the back side thereof (the distance L2 is approximately equal to the distance L1). Therefore, as shown in FIG. 6, the positional relationships between the light spots 8a1S' and 8b1S' formed by the 0th-order components passing through the diffraction grating 9 of the −1st-order diffracted light beams 8a1' and 8b1', between the light spots 8a2S' and 8b2S' formed by the 0th-order components passing through the diffraction grating 9 of the −1st-order diffracted light beam 8a2' and 8b2', between the light spots 8a3S' and 8b3S' formed by the 0th-order components passing through the diffraction grating 9 of the −1st-order diffracted light beam 8a3' and 8b3', and between the light spots 8a4S' and 8b4S' formed by the 0th-order components passing through the diffraction grating 9 of the −1st-order diffracted light beam 8a4' and 8b4' are such that they are symmetrical with respect to intersection points of the respective diffraction optical axes $m_1'$, $m_2'$, $m_3'$, and $m_4'$ with the detection plane 7S (which are in the vicinity of the boundaries 71a', 72a', 73a', and 74a', respectively).

Furthermore, as shown in FIG. 7, with regard to the returned light 8a diffracted by the hologram 4, the 0th-order components passing through the diffraction grating 9 of the 1st-order diffracted light beams 8a1, 8a2, 8a3 and 8a4 diffracted in the first quadrant 41 to the fourth quadrant 44, respectively, are focused on a position located at a distance L1 from the detection plane 7S on the back side thereof. In contrast, with regard to the returned light 8b diffracted by the hologram 4, the 0th-order components passing through the diffraction grating 9 of the 1st-order diffracted light beams 8b1, 8b2, 8b3, and 8b4 diffracted in the first quadrant 41 to the fourth quadrant 44, respectively, are focused on a position located at a distance L3 from the detection plane 7S on the back side thereof (note here that L3−L1=L1+L2). Therefore, as shown in FIG. 6, the light spots 8b1S, 8b2S, 8b3S, and 8b4S formed by the 0th-order components passing through the diffraction grating 9 of the 1st-order diffracted light beams 8b1, 8b2, 8b3 and 8b4 correspond to light spots obtained by enlarging the light spots 8a1S, 8a2S, 8a3S, and 8a4S formed by the 0th-order components passing through the diffraction grating 9 of 1st-order diffracted light beam 8a1, 8a2, 8a3 and 8a4 about three times with the intersection points of the respective diffraction optical axes $m_1$, $m_2$, $m_3$, and $m_4$ with the detection plane 7S (i.e., the positions corresponding to the axes of the respective sectors) being fixed.

Some of the detector cells are electrically connected, so that the following nine signals can be obtained.

S1=a signal obtained in the detector cell 71+a signal obtained in the detector cell 71'

S2=a signal obtained in the detector cell 72+a signal obtained in the detector cell 72'

S3=a signal obtained in the detector cell 73+a signal obtained in the detector cell 73'

S4=a signal obtained in the detector cell 74+a signal obtained in the detector cell 74'

S5=a signal obtained in the detector cell 75a+a signal obtained in the detector cell 75b+a signal obtained in the detector cell 75c+a signal obtained in the detector cell 75d+a signal
obtained in the detector cell 75c'+a signal
obtained in the detector cell 75d'

F1=a signal obtained in the detector cell 7F1+a signal obtained in the detector cell 7F3+a signal
obtained in the detector cell 7F5+a signal
obtained in the detector cell 7F7+a signal
obtained in the detector cell 7F2'+a signal
obtained in the detector cell 7F4'+a signal
obtained in the detector cell 7F6'

F2=a signal obtained in the detector cell 7F2+a signal obtained in the detector cell 7F4+a signal
obtained in the detector cell 7F6+a signal
obtained in the detector cell 7F1'+a signal
obtained in the detector cell 7F3'+a signal
obtained in the detector cell 7F5'+a signal
obtained in the detector cell 7F7'

T1=a signal obtained in the detector cell 7T1+a signal obtained in the detector cell 7T3+a signal
obtained in the detector cell 7T1'+a signal
obtained in the detector cell 7T3'

T2=a signal obtained in the detector cell 7T2+a signal obtained in the detector cell 7T4+a signal
obtained in the detector cell 7T2'+a signal
obtained in the detector cell 7T4'

With the arrow 6R shown in FIG. 2 indicating the radial direction of the optical disk, a focus error signal FE that indicates an error in focusing light on the first signal plane 6a or the second signal plane 6b of the optical disk, a tracking error signal TE that indicates an error in tracking an optical disk track, a reproduction signal RF that is reproduced from the optical disk signal plane, and a stray light signal SL obtained from the proximity plane are detected based on the following formulae (5) to (8).

$$FE = F2 - F1 \quad \text{Formula (5)}$$

$$TE = S1 + S4 - S2 - S3 - m \times (T2 - T1) \quad \text{Formula (6)}$$

$$RF = S1 + S2 + S3 + S4 - S5 \quad \text{Formula (7)}$$

$$SL = S5 \quad \text{Formula (8)}$$

In the above formula (6), S1+S4−S2−S3 includes a large volume of tracking error information and a small volume of information about the shift of the objective lens 5, while T2−T1 includes a small volume of tracking error information and a large volume of information about the shift of the objective lens 5. Therefore, the tracking error detection method based on the above formula (6) is a tracking error detection method by which an effect of the shift of the objective lens 5 (deviation of the central axis of the objective lens 5 from the optical axis due to the tracking control) can be cancelled by calculating the formula that includes S1+S4−S2−S3 and T2−T1 with a suitable coefficient m (needless to say, this method is an ordinary tracking error detection method when m=0).

In FIG. 3, the light spots 8a1S, 8a2S, 8a3S, and 8a4S are within the detector cells 71, 72, 73, and 74, respectively, the light spots 8b1S, 8b2S, 8b3S, and 8b4S are within the detector cells 75d, 75b, 75a, and 75c, respectively, and the light spots 8a1S', 8a2S', 8a3S', 8a4S', 8b1S', 8b2S', 8b3S', and 8b4S' are within the detector cells 71', 72', 73', and 74'. On the other hand, in FIG. 6, the light spots 8a1S', 8a2S', 8a3S', and 8a4S' are within the detector cells 71', 72', 73', and 74', respectively, the light spots 8b1S', 8b2S', 8b3S', and 8b4S' are within the detector cells 75d', 75a, 75b, and 75c', respectively, and the light spots 8a1S, 8a2S, 8a3S, 8a4S, 8b1S, 8b2S, 8b3S, and 8b4S are within the detector cells 71, 72, 73, and 74. Therefore, regardless of whether the focal point on the optical disk is on the first signal plane 6a or on the second signal plane 6b, the signal SL represented by the formula (8) indicates the amount of stray light components from the proximity plane. On the other hand, since the amount of stray light components from the proximity plane included in S1+S2+S3+S4 is equal to the amount of stray light components included in S5, the stray light components are removed substantially completely by the formula (7) for detecting the reproduction signal RF that is reproduced from the optical disk signal plane. Therefore, regardless of the recording state of the proximity plane or the presence of an address pit, accurate reading of the reproduction signal from the focus control plane becomes possible. In general, when signals are recorded on the second signal plane 6b, it is possible to control an intensity of a light spot for recording signals on the second signal plane 6b so as to allow accurate signal writing on the second signal plane 6b by estimating an amount of light passing through the first signal plane 6a from the stray light signal SL that indicates an amount of light reflected by the first signal plane 6a and then increasing/decreasing the output from the light source I based on this estimate value.

Figure 8:
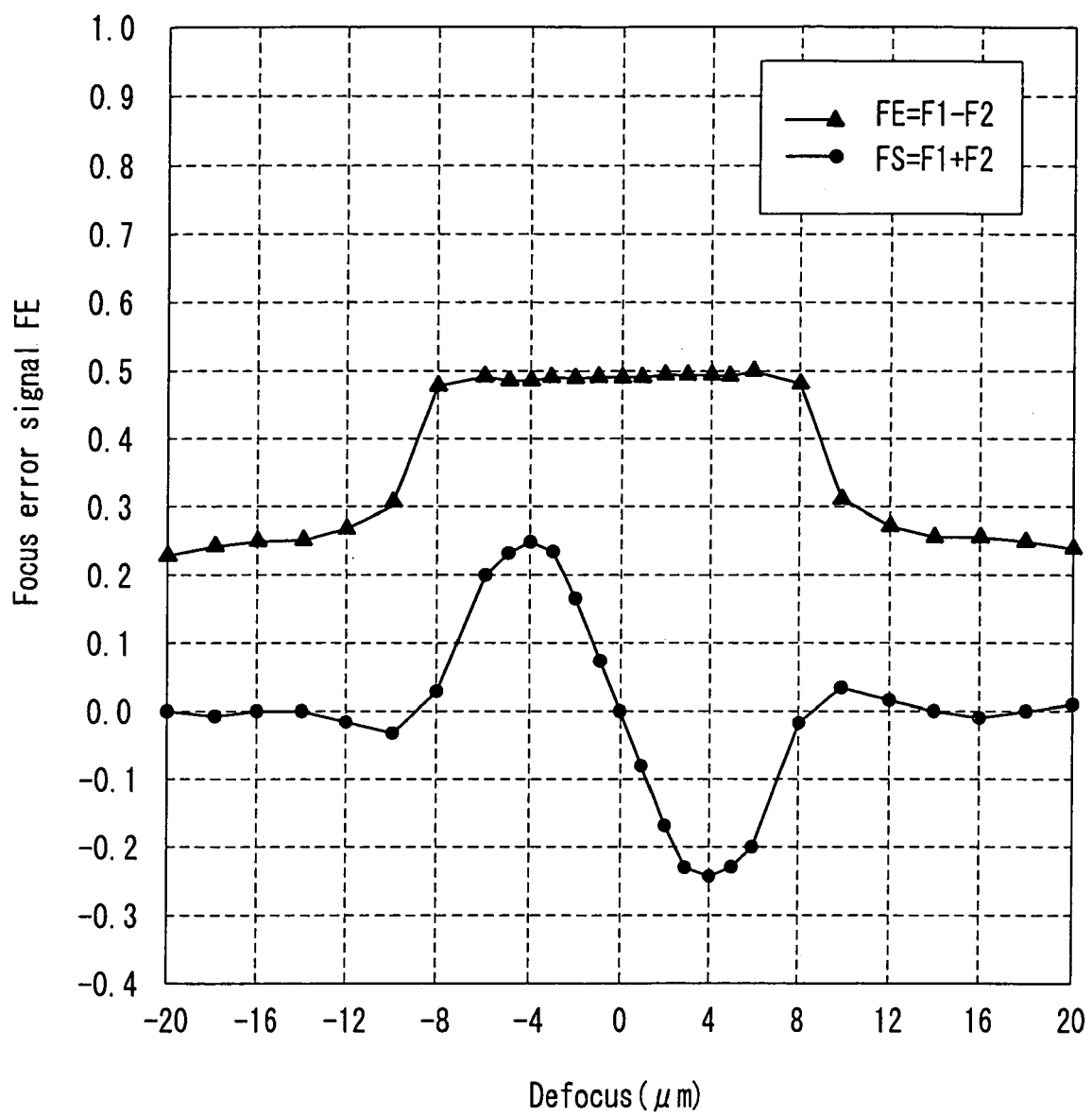
FIG. 8 is a graph showing the relationship between defocus and a focus error signal FE in the optical disk device according to embodiments of the present invention.

FIG. 8 shows the relationship between defocus and a focus error signal FE in the optical disk device according to the present embodiment. FIG. 8 shows the relationship in the case where the optical disk has the first signal plane 6a alone as a signal plane and is not provided with the second signal plane 6b (alternatively, the optical disk has the second signal plane 6b alone as a signal plane and is not provided with the first signal plane 6a). Note here that the defocus caused when the objective lens 5 approaches the signal plane is regarded as the negative (−) defocus. It is to be noted here that, with regard to a FS signal (FS=F1+F2) in FIG. 8, neither the signal F1 nor F2 is involved in the detection of the reproduction signal RF that is reproduced from the optical disk signal plane. Thus, unlike the conventional optical disk device, the relationship represented by the above formula (4) is not satisfied in the optical disk device of the present embodiment. In the case where the distance d between the first signal plane 6a and the second signal plane 6b is 25 μm and the refractive index n of the transparent medium filling the space between the first signal plane 6a and the second signal plane 6b is 1.57, the effect of the second signal plane 6b during a focusing operation with respect to the first signal plane 6a corresponds to the state where the defocus d/n=−16 μm in FIG. 8, and the effect of the first signal plane 6a during a focusing operation with respect to the second signal plane 6b corresponds to the state where the defocus d/n=16 μm in FIG. 8. In either case, an offset amount of the focus error signal FE is substantially zero. From this fact, it is understood that the proximity plane has substantially no effect on focus control. The reason for this is as follows. When a focal point on the signal plane is focused, in FIG. 3, most of the regions of the light spots 8b1F, 8b2F, 8b3F, and 8b4F formed by the stray light components from the proximity plane are outside the detector cells 7F1, 7F2, 7F3, 7F4, 7F5, 7F6, and 7F7 so that the stray light components are not detected as the signal F1 or F2, and the light spots 8b1F', 8b2F', 8b3F', and 8b4F' formed by the stray light components extend so as to cover almost an entire area of the detector cells 7F2', 7F3', 7F4', 7F5', and 7F6', the stray light components are cancelled so as not to be detected as the focus error signal FE.

Also, in FIG. 6, most of the regions of the light spots 8b1F', 8b2F', 8b3F', and 8b4F' formed by the stray light components from the proximity plane are outside the detector cells 7F1', 7F2', 7F3', 7F4', 7F5', 7F6' and 7F7' so that the stray light components are not detected as the signal F1 or F2, and the light spots 8b1F, 8b2F, 8b3F, and 8b4F formed by the stray light components extend so as to cover almost an entire area of the detector cells 7F2, 7F3, 7F4, 7F5, and 7F6 so that the stray light components are cancelled so as not to be detected as the focus error signal FE.

For the reasons stated above, accurate focusing with respect to the focus control plane is not disturbed, thereby allowing accurate signal reading or writing.

Although the present embodiment is directed to the case where the stray light components of the reproduction signal RF that is reproduced from the optical disk signal plane are removed by calculation, the reproduction signal RF may be detected in the following manner (the same applies to other embodiments, which will be described later).

For example, it is possible to remove stray light components in the reproduction signal RF that is reproduced from the optical disk signal plane by configuring the optical desk device so as to switch the formula used for determining the RF as follows.

In the case where a focal point of the objective lens 5 is on the first signal plane 6a of the optical disk, the following formula (7a) is used.

RF=a signal obtained in the detector cell 71+a signal
obtained in the detector cell 72+a signal
obtained in the detector cell 73+a signal
obtained in the detector cell 74         Formula (7a)

On the other hand, in the case where a focal point of the objective lens 5 is on the second signal plane 6b of the optical disk, the following formula (7b) is used.

RF=a signal obtained in the detector cell 71'+a signal obtained in the detector cell 72'+a signal
obtained in the detector cell 73'+a signal
obtained in the detector cell 74'         Formula (7b)

Second Embodiment

Although the wavefront is divided into four equal parts by the hologram in the above-described first embodiment, the wavefront may be divided into n equal parts (n is an integer of 2 or more). The following description is directed to an example where the wavefront is divided into two equal parts.

Figure 9:
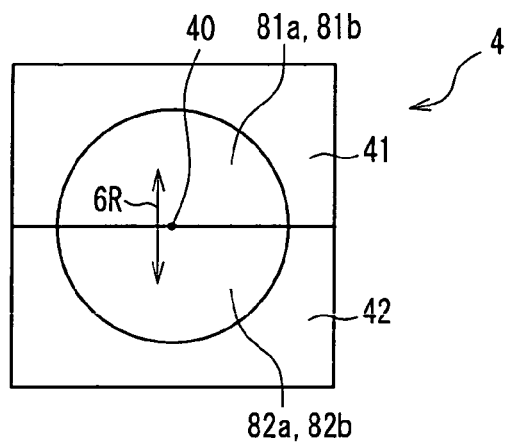
FIG. 9 shows a hologram pattern formed on a hologram that serves as an optical splitter in an optical disk device according to a second embodiment of the present invention.

FIG. 9 shows a hologram pattern formed on a hologram that serves as an optical splitter in an optical disk device according to a second embodiment of the present invention and FIG. 10 shows a photodetection pattern formed on a photodetector that is used in the optical disk device and light distribution on the photodetector. The optical disk device of the present embodiment is the same as the optical disk device of the above-described first embodiment except for a configuration of the hologram and a detection pattern on the photodetector. The elements common to the optical disk device of the present embodiment and the optical disk device of the first embodiment are indicated with the same numerals and characters as those used for describing the optical disk device of the first embodiment.

As shown in FIG. 9, a hologram 4 is divided into two equal parts, namely, a (1+2) quadrant 41 and a (3+4) quadrant 42, by a straight line that passes through an intersection point 40 of the optical axis and a surface of the hologram 4. Returned light 8 from a first signal plane 6a (or a second signal plane 6b) of an optical disk is divided equally into two light beams, namely, a (1+2) quadrant light beam 81a (or 81b) and a (3+4) quadrant light beam 82a (or 82b) by the respective quadrants of the hologram 4. These quadrant light beams are diffracted in the respective quadrants.

As shown in FIG. 10, a reproduction signal detecting part of a photodetector 7 includes detector cells 71, 72, 73, and 74 and detector cells 71', 72', 73', and 74' that are arranged to be axisymmetrical to these detector cells 71, 72, 73, and 74.

Figure 10A:
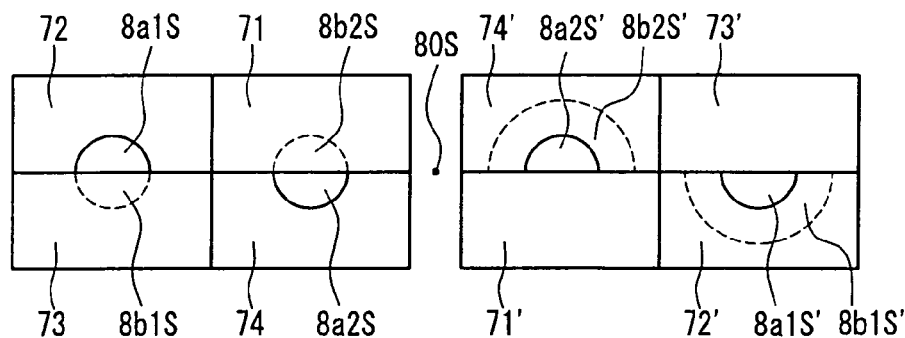
FIG. 10A shows positions of light spots in the case where a focal point of an objective lens is on a first signal plane of an optical disk.

FIG. 10A shows positions of light spots in the case where a focal point of an objective lens 5 is on the first signal plane 6a of the optical disk. When returned light 8a is projected on the reproduction signal detecting part of the photodetector 7, a point 80S shown in FIG. 10A is a position where, with regard to 0th-order diffracted light beams derived from the (1+2) quadrant light beam 81a and the (3+4) quadrant light beam 82a that have passed through the hologram 4, 0th-order components that have passed through the diffraction grating 9 are focused. A 0th-order component passing through the diffraction grating 9 of a 1st-order diffracted light beam 8a1 derived from the (1+2) quadrant light beam 81a forms a light spot 8a1S within the detector cell 72. A 0th-order component passing through the diffraction grating 9 of a −1st-order diffracted light beam 8a1' derived from the (1+2) quadrant light beam 81a forms a light spot 8a1S' within the detector cell 72'. A 0th-order component passing through the diffraction grating 9 of a 1st-order diffracted light beam 8a2 derived from the (3+4) quadrant light beam 82a forms a light spot 8a2S within the detector cell 74. A 0th-order component passing through the diffraction grating 9 of a −1st-order diffracted light beam 8a2' derived from the (3+4) quadrant light beam 82a forms a light spot 8a2S' within the detector cell 74' (the respective light spots are indicated with solid lines).

When the returned light 8b is projected on the reproduction signal detecting part of the photodetector 7, a 0th-order component passing through the diffraction grating 9 of a 1st-order diffracted light beam 8b1 derived from the (1+2) quadrant light beam 81b forms a light spot 8b1S within the detector cell 73. A 0th-order component passing through the diffraction grating 9 of a −1st-order diffracted light beam 8b1' derived from the (1+2) quadrant light beam 81b forms a light spot 8b1S' within the detector cell 72'. A 0th-order component passing through the diffraction grating 9 of a 1st-order diffracted light beam 8b2 derived from the (3+4) quadrant light beam 82b forms a light spot 8b2S within the detector cell 71. A 0th-order component passing through the diffraction grating 9 of a −1st-order diffracted light beam 8b2' derived from the (3+4) quadrant light beam 82b forms a light spot 8b2S' within the detector cell 74' (the respective light spots are indicated with dashed lines).

Figure 10B:
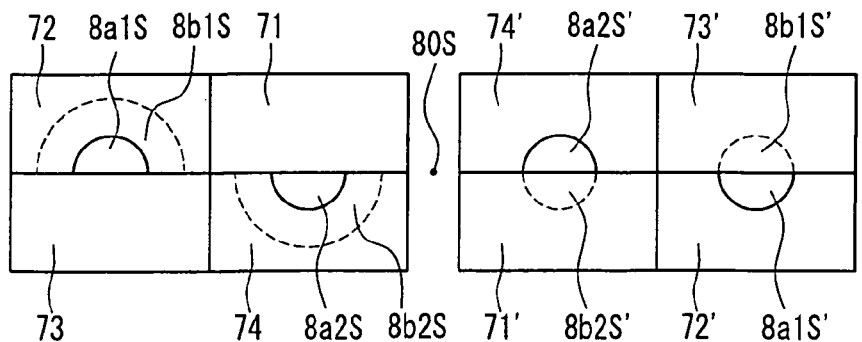
FIG. 10B shows positions of light spots in the case where a focal point of the objective lens is on a second signal plane of the optical disk.

On the other hand, FIG. 10B shows positions of light spots in the case where a focal point of the objective lens 5 is on the second signal plane 6b of the optical disk. When the returned light 8a is projected on the reproduction signal detecting part of the photodetector 7, a 0th-order component passing through the diffraction grating 9 of a 1st-order diffracted light beam 8a1 derived from the (1+2) quadrant light beam 81a forms a light spot 8a1S within the detector cell 72. A 0th-order component passing through the diffraction grating 9 of a −1st-order diffracted light beam 8a1' derived from the (1+2) quadrant light beam 81a forms a light spot 8a1S' within the detector cell 72'. A 0th-order component passing through the diffraction grating 9 of a 1st-order diffracted light beam 8a2 derived from the (3+4) quadrant light beam 82a forms a light spot 8a2S within the detector cell 74. A 0th-order component passing through the diffraction grating 9 of a −1st-order diffracted light beam 8a2' derived from the (3+4) quadrant light beam 82a forms a light spot 8a2S' within the detector cell 74' (the respective light spots are indicated with solid lines).

When the returned light 8*b* is projected on the reproduction signal detecting part of the photodetector 7, a 0th-order component passing through the diffraction grating 9 of a 1st-order diffracted light beam 8*b*1 derived from the (1+2) quadrant light beam 81*b* forms a light spot 8*b*1S within the detector cell 72. A 0th-order component passing through the diffraction grating 9 of a −1st-order diffracted light beam 8*b*1' derived from the (1+2) quadrant light beam 81*b* forms a light spot 8*b*1S' within the detector cell 73'. A 0th-order component passing through the diffraction grating 9 of a 1st-order diffracted light beam 8*b*2 derived from the (3+4) quadrant light beam 82*b* forms a light spot 8*b*2S within the detector cell 74. A 0th-order component passing through the diffraction grating 9 of a −1st-order diffracted light beam 8*b*2' derived from the (3+4) quadrant light beam 82*b* forms a light spot 8*b*2S' within the detector cell 71' (the respective light spots are indicated with dashed lines).

Therefore, by detecting a reproduction signal RF that is reproduced from the optical disk signal plane and a stray light signal SL obtained from the proximity plane based on the following formulae (9) and (10), the same effect as that obtained in the above-described first embodiment can be obtained.

RF=a signal obtained in the detector cell 72+a signal obtained in the detector cell 74+a signal obtained in the detector cell 72'+a signal obtained in the detector cell 74'−SL  Formula (9)

SL=a signal obtained in the detector cell 71+a signal obtained in the detector cell 73+a signal obtained in the detector cell 71'+a signal obtained in the detector cell 73'  Formula (10)

Third Embodiment

Figure 11:
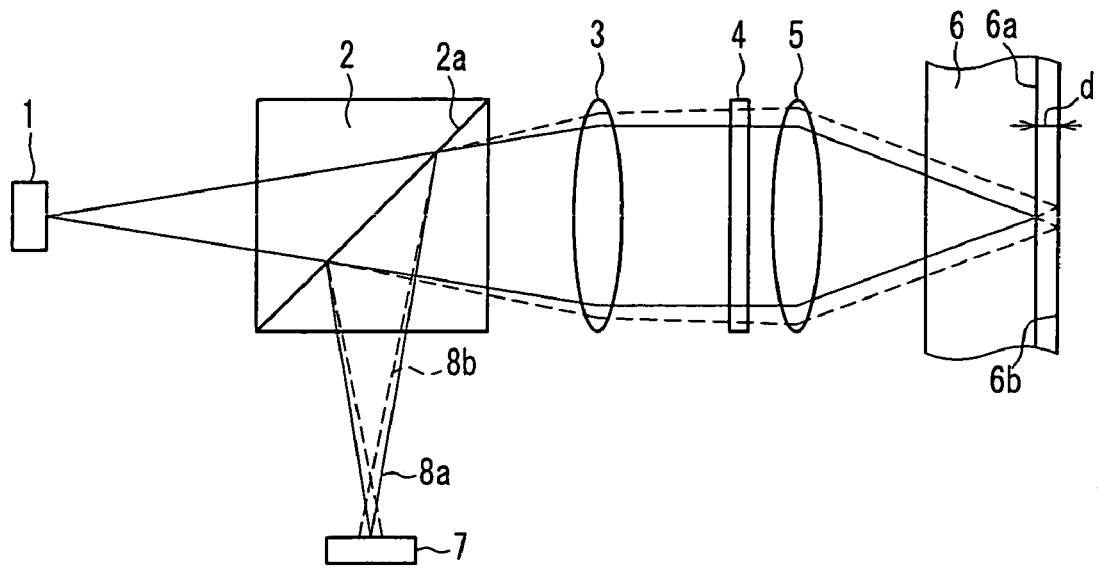
FIG. 11 is a schematic cross-sectional view of an optical disk device according to a third embodiment of the present invention (in the case where light is focused on a first signal plane of an optical disk).
Figure 12:
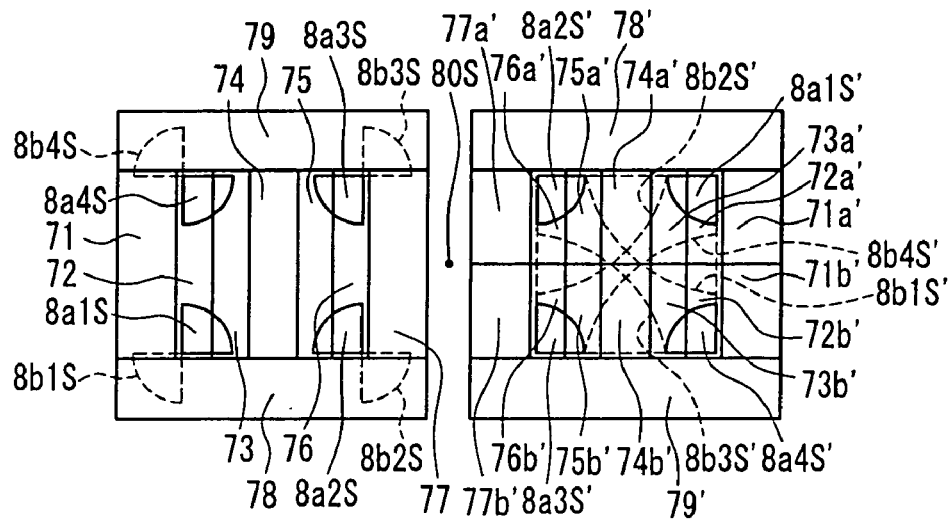
FIG. 12 shows a photodetection pattern formed on a photodetector that is used in the optical disk device according to the third embodiment of the present invention and light distribution on the photodetector in the state shown in FIG. 11.
Figure 13:
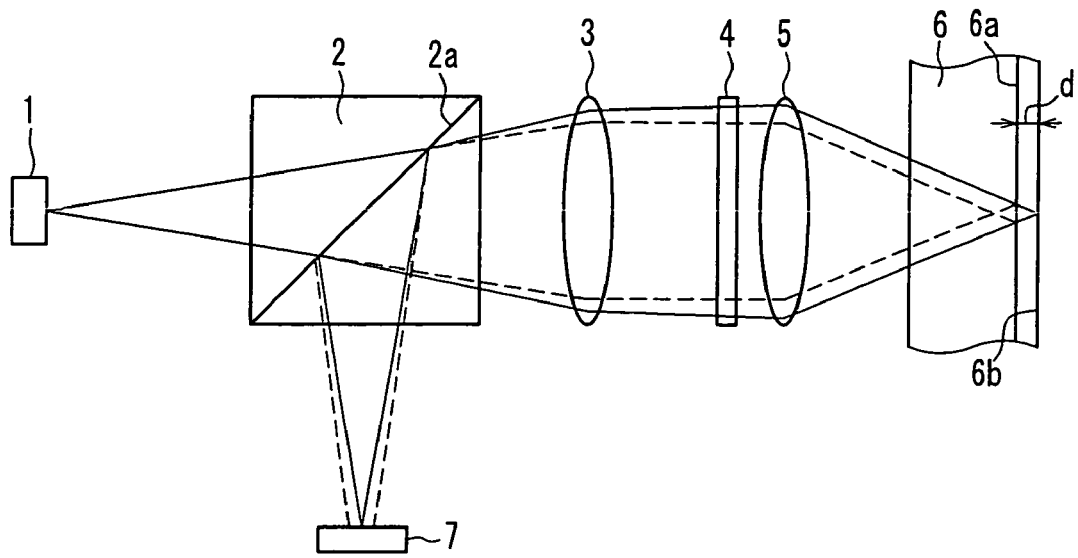
FIG. 13 is a schematic cross-sectional view showing the optical disk device according to the third embodiment of the present invention (in the case where light is focused on a second signal plane of the optical disk).
Figure 14:
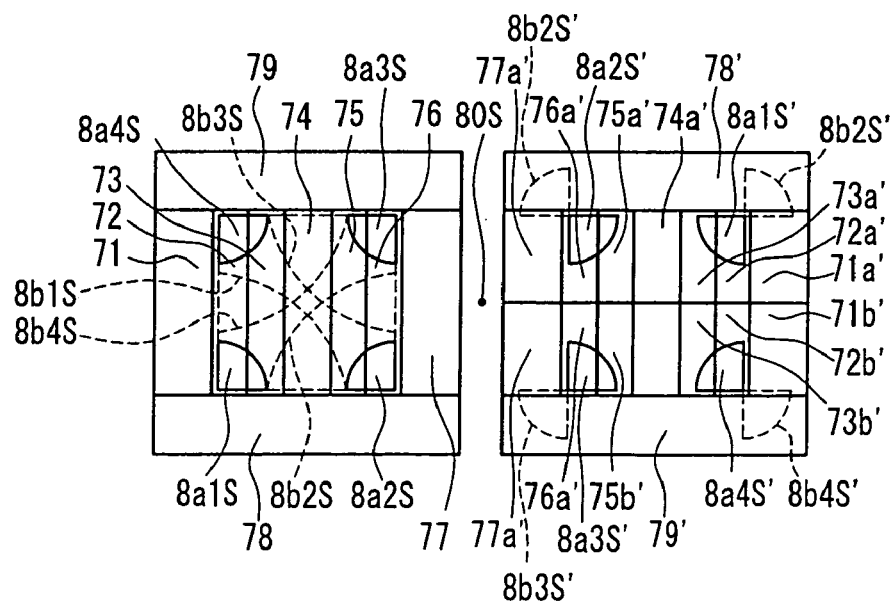
FIG. 14 shows a photodetection pattern formed on the photodetector that is used in the optical disk device according to the third embodiment of the present invention and light distribution on the photodetector in the state shown in FIG. 13.

FIG. 11 is a schematic cross-sectional view of an optical disk device according to a third embodiment of the present invention (in the case where light is focused on a first signal plane of an optical disk). FIG. 12 shows a photodetection pattern formed on a photodetector that is used in this optical disk device and light distribution on the photodetector in the state shown in FIG. 11, FIG. 13 is a schematic cross-sectional view showing the optical disk device according to the third embodiment of the present invention (in the case where light is focused on a second signal plane of the optical disk), and FIG. 14 shows a photodetection pattern formed on the photodetector that is used in this optical disk device and light distribution on the photodetector in the state shown in FIG. 13. The optical disk device of the present embodiment is the same as the optical disk device of the above-described first embodiment except that the diffraction grating 9 is not provided and a photodetection pattern and light distribution on a photodetector 7 are different from those in the optical disk device of the first embodiment. The elements common to the optical disk device of the present embodiment and the optical disk device of the first embodiment are indicated with the same numerals and characters as those used for describing the optical disk device of the first embodiment.

As shown in FIG. 12, a reproduction signal detecting part of the photodetector 7 includes detector cells 71 to 79 and detector cells 71' to 79' that are arranged to be axisymmetrical to these detector cells 71 to 79. Among these detector cells, the detector cells 71' to 77' are divided further into two equal parts, namely, 71*a*' and 71*b*', . . . , 77*a*' and 77*b*', respectively.

As shown in FIG. 11, light emitted from the light source 1 passes through the beam splitter 2 and is converged by the collimator lens 3 to turn into parallel light. After passing through the hologram 4, the parallel light is focused on the first signal plane 6*a* of the optical disk by the objective lens 5 (the light path is indicated with a solid line). Returned light 8*a*, which is the light reflected by the first signal plane 6*a*, is converged by the objective lens 5 and enters the hologram 4 to be diffracted by the hologram 4. The returned light 8*a* diffracted by the hologram 4 then is converged by the collimator lens 3 and is reflected by a split plane 2*a* of the beam splitter 2, whereby the light path of the returned light 8*a* is bent. The returned light 8*a* whose light path has been bent is focused on the photodetector 7 in a diffused state (the light path of a 0th-order diffracted light beam is indicated with a solid line).

The first signal plane 6*a* of the optical disk is semi-transparent. Thus, among light focused on the first signal plane 6*a*, light passing through the first signal plane 6*a* reaches the second signal plane 6*b*. Then, returned light 8*b*, which is the light reflected by the second signal plane 6*b*, passes through the first signal plane 6*a* again, is converged by the objective lens 5, and enters the hologram 4 to be diffracted by the hologram 4. The returned light 8*b* diffracted by the hologram 4 then is converged by the collimator lens 3 and is reflected by the split plane 2*a* of the beam splitter 2, whereby the light path of the returned light 8*b* is bent. The returned light 8*b* whose light path has been bent then is focused on the photodetector 7 in a diffused state (the light path of a 0th-order diffracted light beam is indicated with a dashed line). Note here that the focal point of the returned light 8*b* is on the front side of the focal point of the returned light 8*a* (i.e., on the side closer to the beam splitter 2).

As in the above-described first embodiment (see FIG. 2), the hologram 4 is divided into four equal parts, namely, a first quadrant 41, a second quadrant 42, a third quadrant 43, and a fourth quadrant 44, by straight lines that intersect with each other at an intersection point 40 of the optical axis and a surface of the hologram 4. The returned light 8 from the first signal plane 6*a* (or the second signal plane 6*b*) of the optical disk is divided equally into four light beams, namely, a first quadrant light beam 81*a* (or 81*b*), a second quadrant light beam 82*a* (or 82*b*), a third quadrant light beam 83*a* (or 83*b*), a fourth quadrant light beam 84*a* (or 84*b*), by the respective quadrants of the hologram 4. These quadrant light beams are diffracted in the respective quadrants. The hologram 4 achieves a diffraction efficiency of about 0% for a 0th-order light beam and a diffraction efficiency of about 40% for ±1st-order light beams, for example.

When the returned light 8*a* is projected on the reproduction signal detecting part of the photodetector 7, a point 80S shown in FIG. 12 is a position where 0th-order diffracted light beams derived from the first quadrant light beam 81*a*, the second quadrant light beam 82*a*, the third quadrant light beam 83*a*, and the fourth quadrant light beam 84*a* that have passed through the hologram 4 are focused. A −1st-order diffracted light beam 8*a*1 derived from the first quadrant light beam 81*a* forms a light spot 8*a*1S within the detector cells 72 and 73. A −1st-order diffracted light beam 8*a*1' derived from the first quadrant light beam 81*a* forms a light spot 8*a*1S' within the detector cells 72' and 73'. A 1st-order diffracted light beam 8*a*2 derived from the second quadrant light beam 82*a* forms a light spot 8*a*2S within the detector cells 75 and 76. A −1st-order diffracted light beam 8*a*2' derived from the second quadrant light beam 82*a* forms a light spot 8*a*2S' within the detector cells 75' and 76'. A 1st-order diffracted light beam 8*a*3 derived from the third quadrant light beam 83*a* forms a light spot 8*a*3S within the detector cells 75 and 76. A −1st-order diffracted light beam 8*a*3' derived from the third quadrant light beam 83*a* forms a light spot 8*a*3S' within the detector cells 75' and 76'. A 1st-order diffracted light beam 8a4 derived from the fourth quadrant light beam 84a forms a light spot 8a4S within the detector cells 72 and 73. A −1st-order diffracted light beam 8a4' derived from the fourth quadrant light beam 84a forms a light spot 8a4S' within the detector cells 72' and 73' (the respective light spots are indicated with solid lines).

When the returned light 8b is projected on the reproduction signal detecting part of the photodetector 7, a 1st-order diffracted light beam 8b1 derived from the first quadrant light beam 81b forms a light spot 8b1S, most part of which is within the detector cell 78. A −1st-order diffracted light beam 8b1' derived from the first quadrant light beam 81b forms a light spot 8b1S' that extends within the detector cells 72' to 76'. A 1st-order diffracted light beam 8b2 derived from the second quadrant light beam 82b forms a light spot 8b2S, most part of which is within the detector cell 78. A −1st-order diffracted light beam 8b2' derived from the second quadrant light beam 82b forms a light spot 8b2S' that extends within the detector cells 72' to 76'. A 1st-order diffracted light beam 8b3 derived from the third quadrant light beam 83b forms a light spot 8b3S, most part of which is within the detector cell 79. A −1st-order diffracted light beam 8b3' derived from the third quadrant light beam 83b forms a light spot 8b3S' that extends within the detector cells 72' to 76'. A 1st-order diffracted light beam 8b4 derived from the fourth quadrant light beam 84b forms a light spot 8b4S, most part of which is within the detector cell 79. A −1st-order diffracted light-beam 8b4' derived from the fourth quadrant light beam 84b forms a light spot 8b4S' that extends within the detector cells 72' to 76' (the respective light spots are indicated with dashed lines).

Note here that the above-described light spots are identical to the light spots projected on the reproduction signal detecting part shown in FIG. 3 in the above-described first embodiment.

As shown in FIG. 13, when light is focused on the second signal plane 6b of the optical disk, the focal point of the returned light 8b is on the back side of the focal point of the returned light 8a i.e., on the side farther from the beam splitter 2). Except for this, FIG. 13 is identical to FIG. 11. Thus, the duplicate description will be omitted here.

As shown in FIG. 13, among light focused on the second signal plane 6b, the returned light 8b reflected by the first signal plane 6a is converged by the objective lens 5 and enters the hologram 4 to be diffracted by the hologram 4. The returned light 8b diffracted by the hologram 4 then is converged by the collimator lens 3 and is reflected by the split plane 2a of the beam splitter 2, whereby the light path of the returned light 8b is bent. The returned light 8b whose light path has been bent then is focused on the photodetector 7 in a diffused state (the light path of a 0th-order diffracted light beam is indicated with a dashed line). Note here that the focal point of the returned light 8b is on the back side of the focal point of the returned light 8a (i.e., on the side farther from the beam splitter 2).

As in the case of FIG. 12, a point 80S shown in FIG. 14 is a position where 0th-order diffracted light beams derived from the first quadrant light beam 81a, the second quadrant light beam 82a, the third quadrant light beam 83a, and the fourth quadrant light beam 84a that have passed through the hologram 4 are focused. The shapes of the light spots formed by the returned light 8a on the detecting part are the same as those shown in FIG. 12. In contrast, the shapes of the light spots formed by the returned light 8b on the detecting part correspond to a pattern obtained by inverting the shapes of the light spots on the detecting part shown in FIG. 12 with respect to the point 80S.

Note here that the above-described light spots are identical to the light spots projected on the reproduction signal detecting part shown in FIG. 3 in the above-described first embodiment.

Some of the detector cells are electrically connected, so that the following seven signals can be obtained.

S1=a signal obtained in the detector cell 71+a signal obtained in the detector cell 73+a signal obtained in the detector cell 75+a signal obtained in the detector cell 77

S2=a signal obtained in the detector cell 72+a signal obtained in the detector cell 74+a signal obtained in the detector cell 76

S3a=a signal obtained in the detector cell 71a'+a signal obtained in the detector cell 73a'+a signal obtained in the detector cell 75a'+a signal obtained in the detector cell 77a'

S3b=a signal obtained in the detector cell 71b'+a signal obtained in the detector cell 73b'+a signal obtained in the detector cell 75b'+a signal obtained in the detector cell 77b'

S4a=a signal obtained in the detector cell 72a'+a signal obtained in the detector cell 74a'+a signal obtained in the detector cell 76a'

S4b=a signal obtained in the detector cell 72b'+a signal obtained in the detector cell 74b '+a signal obtained in the detector cell 76b '

S5=a signal obtained in the detector cell 78+a signal obtained in the detector cell 79+a signal obtained in the detector cell 78'+a signal obtained in the detector cell 79'

With the arrow 6R shown in FIG. 2 indicating the radial direction of the optical disk, a focus error signal FE that indicates an error in focusing light on the first signal plane 6a or the second signal plane 6b of the optical disk, a tracking error signal TE that indicates an error in tracking an optical disk track, a reproduction signal RF that is reproduced from the optical disk signal plane, and a stray light signal SL obtained from the proximity plane are detected based on the following formulae (11) to (14).

$$FE = S1 + S4a + S4b - (S2 + S3a + S3b) \quad \text{Formula (11)}$$

$$TE = S3b + S4b - S3a - S4a \quad \text{Formula (12)}$$

$$RF = S1 + S2 + S3a + S3b + S4a + S4b - S5 \quad \text{Formula (13)}$$

$$SL = S5 \quad \text{Formula (14)}$$

As in the above-described first embodiment, in FIG. 12, the light spots 8a1S, 8a2S, 8a3S, and 8a4S are within the detector cells 72 to 76, the light spots 8b1S, 8b2S, 8b3S, and 8b4S are approximately within the detector cells 78 and 79, and the light spots 8a1S', 8a2S', 8a3S', 8a4S', 8b1S', 8b2S', 8b3S', and 8b4S' are within the detector cells 72' to 76'. On the other hand, in FIG. 14, the light spots 8a1S', 8a2S', 8a3S', and 8a4S' are within the detector cells 72' to 76', the light spots 8b1S', 8b2S', 8b3S', and 8b4S' are approximately within the detector cells 78' and 79', and the light spots 8a1S, 8a2S, 8a3S, 8a4S, 8b1S, 8b2S, 8b3S, and 8b4S are within the detector cells 72 to 76. Therefore, regardless of whether the focal point on the optical disk is on the first signal plane 6a or on the second signal plane 6b, the signal SL represented by the formula (14) indicates the amount of stray light components from the proximity plane. On the other hand, since the amount of stray light components from the proximity plane included in S1+S2+S3a+S3b+S4a+S4b is equal to the amount of stray light components included in S5, the stray light components are removed substantially completely by the formula (13) for detecting the reproduction signal RF that is reproduced from the optical disk signal plane. Therefore, regardless of the recording state of the proximity plane or the presence of an address pit, accurate reading of the reproduction signal from the focus control plane becomes possible. In general, when signals are recorded on the second signal plane 6b, an amount of light passing through the first signal plane 6a can be estimated from the stray light signal SL that indicates an amount of light reflected by the first signal plane 6a. Thus, by increasing/decreasing the output from the light source 1 based on this estimate value, it is possible to control an intensity of a light spot for recording signals on the second signal plane 6b so as to allow accurate signal writing on the second signal plane 6b.

Furthermore, a focus error signal FE represented by the above Formula (11) is identical to that in the first embodiment. That is, the relationship between defocus and a focus error signal FE in the present embodiment is given by FIG. 8. Therefore, the proximity plane has substantially no effect on focus control. The reason for this is as follows. When a focal point on the signal plane is focused, in FIG. 12, most of the regions of the light spots 8b1S, 8b2S, 8b3S, and 8b4S formed by the stray light components from the proximity plane are outside the detector cells 71 to 77 so that the stray light components are not detected as the signal F1 or F2, and the light spots 8b1S', 8b2S', 8b3S', and 8b4S' formed by the stray light components extend so as to cover almost an entire area of the detector cells 72' to 76', the stray light components are cancelled so as not to be detected as the focus error signal FE.

Also, in FIG. 14, most of the regions of the light spots 8b1S', 8b2S', 8b3S', and 8b4S' formed by the stray light components from the proximity plane are outside the detector cells 71' to 77' so that the stray light components are not detected as the signal F1 or F2, and the light spots 8b1S, 8b2S, 8b3S, and 8b4S formed by the stray light components extend so as to cover almost an entire area of the detector cells 72 to 76, the stray light components are cancelled so as not to be detected as the focus error signal FE.

For the reasons stated above, accurate focusing with respect to the focus control plane is not disturbed, thereby allowing accurate signal reading or writing. As compared with the optical disk device of the first embodiment, the optical disk device of the present embodiment is advantageous in that it has no diffraction grating 9 and the configuration of the photodetector 7 is simpler.

Fourth Embodiment

Figure 15:
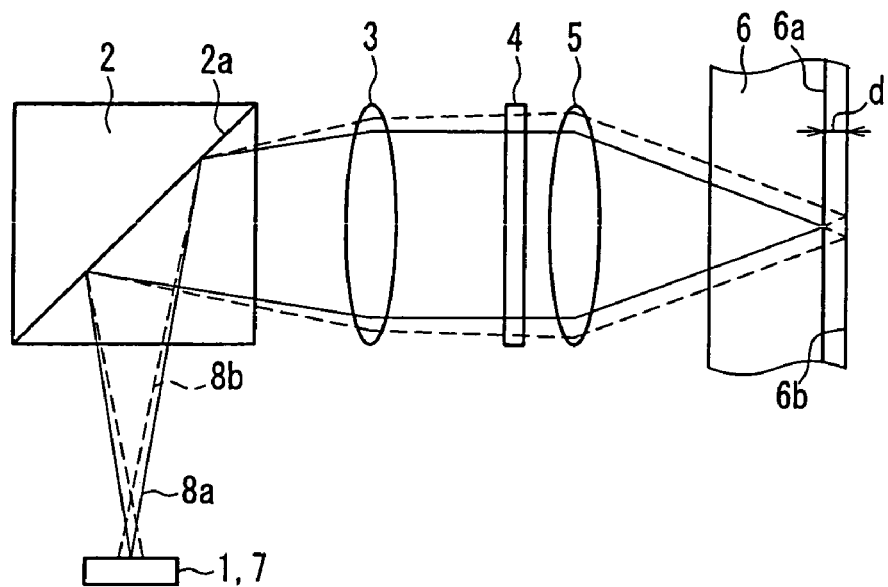
FIG. 15 is a schematic cross-sectional view showing an optical disk device according to a fourth embodiment of the present invention (in the case where light is focused on a first signal plane of an optical disk).
Figure 16:
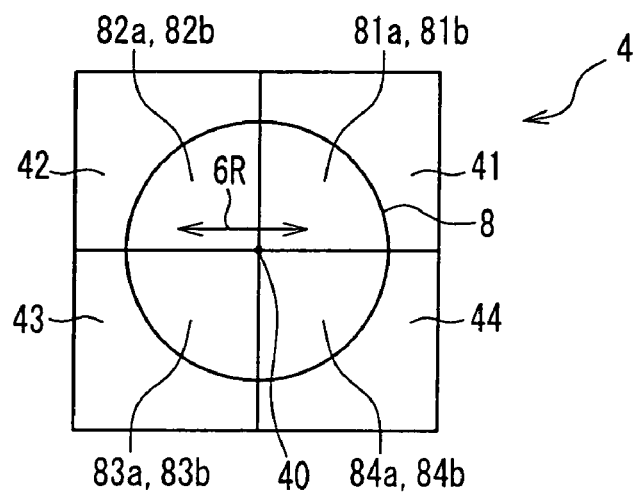
FIG. 16 shows a hologram pattern formed on a hologram that is used in the optical disk device according to the fourth embodiment of the present invention.
Figure 17:
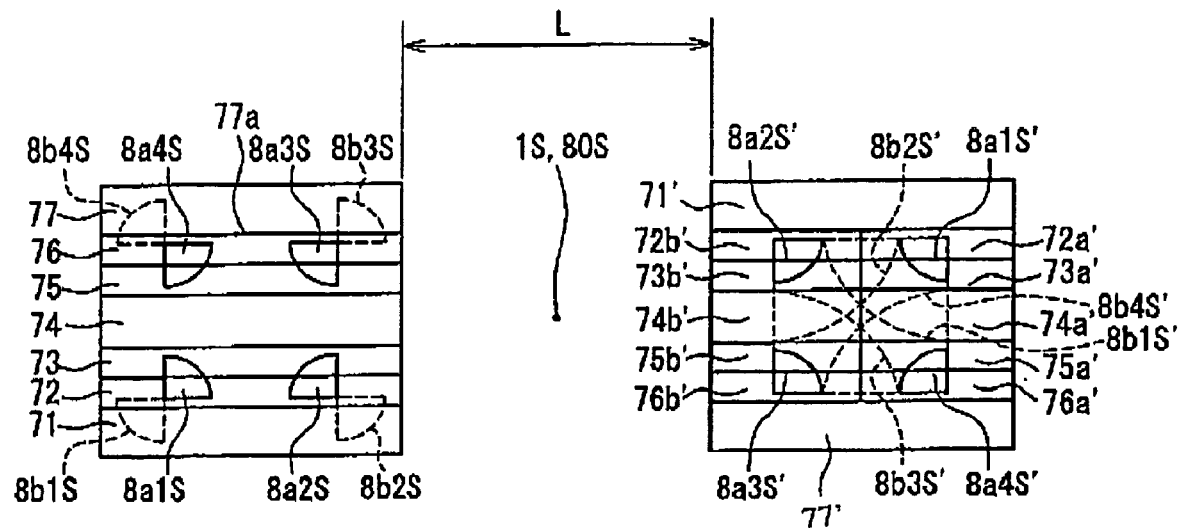
FIG. 17 shows a photodetection pattern formed on a photodetector that is used in the optical disk device according to the fourth embodiment of the present invention and light distribution on the photodetector in the state shown in FIG. 15.
Figure 18:
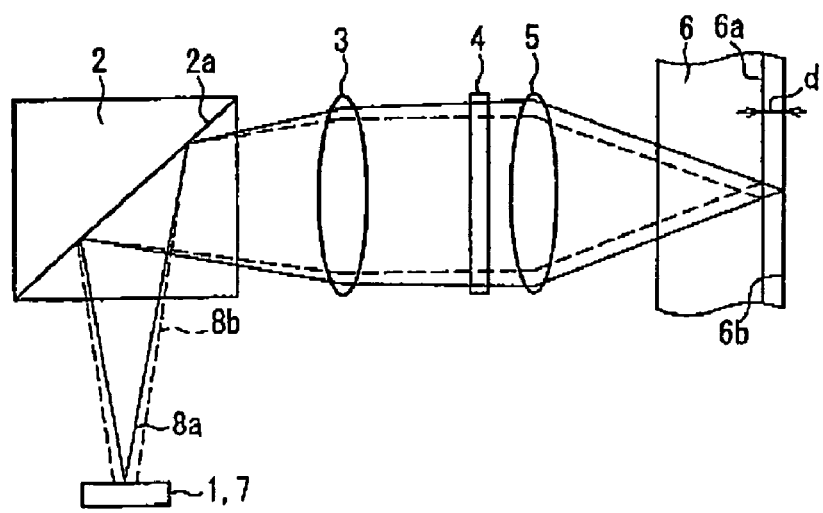
FIG. 18 is a schematic cross-sectional view of the optical disk device according to the fourth embodiment of the present invention (in the case where light is focused on a second signal plane of the optical disk).
Figure 19:
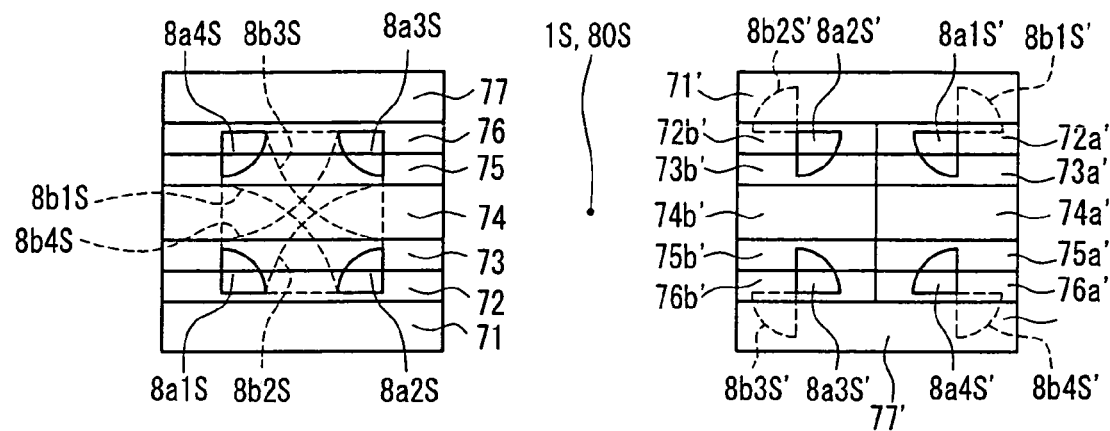
FIG. 19 shows a photodetection pattern formed on the photodetector that is used in the optical disk device according to the fourth embodiment of the present invention and light distribution on the photodetector in the state shown in FIG. 18.

FIG. 15 is a schematic cross-sectional view showing the optical disk device according to a fourth embodiment of the present invention (in the case where light is focused on a first signal plane of an optical disk). FIG. 16 shows a hologram pattern formed on a hologram that is used in this optical disk device, FIG. 17 shows a photodetection pattern formed on a photodetector that is used in the optical disk device and light distribution on the photodetector in the state shown in FIG. 15, FIG. 18 is a schematic cross-sectional view of the optical disk device according to the fourth embodiment of the present invention (in the case where light is focused on a second signal plane of the optical disk), and FIG. 19 shows a photodetection pattern formed on the photodetector that is used in this optical disk device and light distribution on the photodetector in the state shown in FIG. 18. The optical disk device of the present embodiment is the same as the optical disk device of the above-described third embodiment except that a light source 1 is provided on a photodetector 7 and a detection pattern on a photodetector 7 and the direction in which the radial direction 6R of an optical disk extends are different from those in the optical disk device of the third embodiment. The elements common to the optical disk device of the present embodiment and the optical disk device of the third embodiment are indicated with the same numerals and characters as those used for describing the optical disk device of the third embodiment.

As shown in FIG. 17, a reproduction signal detecting part of the photodetector 7 includes detector cells 71 to 77 and detector cells 71' to 77' that are arranged to be axisymmetrical to these detector cells 71 to 77. Among these detector cells, the detector cells 72' to 76' are divided further into two equal parts, namely, 72a' and 72b', . . . , 76a' and 76b', respectively. Since the light source 1 is disposed between the detector cells 71 to 77 and the detector cells 71' to 77', an interval L between the detector cells 71 to 77 and the detector cells 71' to 77' is set to be larger than those in the above-described first embodiment and the third embodiment.

As shown in FIG. 15, light emitted from the light source 1 is reflected by a split plane 2a of a beam splitter 2 so that its light path is bent. The light whose light path has been bent is converged by a collimator lens 3 to turn into parallel light. After passing through a hologram 4, the parallel light is focused on a first signal plane 6a of the optical disk by an objective lens 5 (the light path is indicated with a solid line). Returned light 8a, which is the light reflected by the first signal plane 6a, is converged by the objective lens 5 and enters the hologram 4 to be diffracted by the hologram 4. The returned light 8a diffracted by the hologram 4 then is converged by the collimator lens 3 and is reflected by the split plane 2a of the beam splitter 2, whereby the light path of the returned light 8a is bent. The returned light 8a whose light path has been bent is focused on the photodetector 7 in a diffused state (the light path of a 0th-order diffracted light beam is indicated with a solid line).

The first signal plane 6a of the optical disk is semi-transparent. Thus, among light focused on the first signal plane 6a, light passing through the first signal plane 6a reaches the second signal plane 6b. Then, returned light 8b, which is the light reflected by the second signal plane 6b, passes through the first signal plane 6a again, is converged by the objective lens 5, and enters the hologram 4 to be diffracted by the hologram 4. The returned light 8b diffracted by the hologram 4 then is converged by the collimator lens 3 and is reflected by the split plane 2a of the beam splitter 2, whereby the light path of the returned light 8b is bent. The returned light 8b whose light path has been bent then is focused on the photodetector 7 in a diffused state (the light path of a 0th-order diffracted light beam is indicated with a dashed line). Note here that the focal point of the returned light 8b is on the front side of the focal point of the returned light 8a (i.e., on the side closer to the beam splitter 2).

As shown in FIG. 16, the hologram 4 is divided into four equal parts, namely, a first quadrant 41, a second quadrant 42, a third quadrant 43, and a fourth quadrant 44, by straight lines that intersect with each other at an intersection point 40 of the optical axis and a surface of the hologram 4. Returned light 8 from the first signal plane 6a (or the second signal plane 6b) of the optical disk is divided equally into four light beams, namely, a first quadrant light beam 81a (or 81b), a second quadrant light beam 82a (or 82b), a third quadrant light beam 83a (or 83b), a fourth quadrant light beam 84a (or 84b), by the respective quadrants of the hologram 4. These quadrant light beams are diffracted in the respective quadrants. The hologram 4 achieves a diffraction efficiency of about 0% for a 0th-order light beam and a diffraction efficiency of about 40% for ±1st-order light beams, for example.

When the returned light 8a is projected on the reproduction signal detecting part of the photodetector 7, a point 80S shown in FIG. 17 is a position where 0th-order diffracted light beams derived from the first quadrant light beam 81a, the second quadrant light beam 82a, the third quadrant light beam 83a, and the fourth quadrant light beam 84a that have passed through the hologram 4 are focused (the point 80S also coincides with a light emission point 1S of the light source 1). A 1st-order diffracted light beam 8a1 derived from the first quadrant light beam 81a forms a light spot 8a1S within the detector cells 72 and 73, a −1st-order diffracted light beam 8a1' derived from the first quadrant light beam 81a forms a light spot 8a1S'within the detector cells 72' and 73, a 1st-order diffracted light beam 8a2 derived from the second quadrant light beam 82a forms a light spot 8a2S within the detector cells 72 and 73, a −1st-order diffracted light beam 8a2' derived from the second quadrant light beam 82a forms a light spot 8a2S' within the detector cells 72' and 73', a 1st-order diffracted light beam 8a3 derived from the third quadrant light beam 83a forms a light spot 8a3S within the detector cells 75 and 76, a −1st-order diffracted light beam 8a3' derived from the third quadrant light beam 83a forms a light spot 8a3S' within the detector cells 75' and 76', a 1st-order diffracted light beam 8a4 derived from the fourth quadrant light beam 84a forms a light spot 8a4S within the detector cells 75 and 76, and a −1st-order diffracted light beam 8a4' derived from the fourth quadrant light beam 84a forms a light spot 8a4S' within the detector cells 75' and 76' (the respective light spots are indicated with solid lines).

When the returned light 8b is projected on the reproduction signal detecting part of the photodetector 7, a 1st-order diffracted light beam 8b1 derived from the first quadrant light beam 81b forms a light spot 8b1S, most part of which is within the detector cell 71. A −1st-order diffracted light beam 8b1' derived from the first quadrant light beam 81b forms a light spot 8b1S' that extends within the detector cells 72' to 76'. A 1st-order diffracted light beam 8b2 derived from the second quadrant light beam 82b forms a light spot 8b2S, most part of which is within the detector cell 71. A −1st-order diffracted light beam 8b2' derived from the second quadrant light beam 82b forms a light spot 8b2S' that extends within the detector cells 72' to 76'. A 1st-order diffracted light beam 8b3 derived from the third quadrant light beam 83b forms a light spot 8b3S, most part of which is within the detector cell 77. A −1st-order diffracted light beam 8b3' derived from the third quadrant light beam 83b forms a light spot 8b3S' that extends within the detector cells 72' to 76'. A 1st-order diffracted light beam 8b4 derived from the fourth quadrant light beam 84b forms a light spot 8b4S, most part of which is within the detector cell 77. A −1st-order diffracted light beam 8b4' derived from the fourth quadrant light beam 84b forms a light spot 8b4S' that extends within the detector cells 72' to 76' (the respective light spots are indicated with dashed lines).

Note here that the above-described light spots are identical to the light spots shown in FIG. 12 in the above-described third embodiment, except for a larger interval between the 1st-order diffracted light beams and the −1st-order diffracted light beams.

FIG. 18 is identical to FIG. 15 except that the focal point of the objective lens 5 is on the second signal plane 6b of the optical disk and the focal point of the returned light 8b is on the back side of the focal point of the returned light 8a (i.e., on the side farther from the beam splitter 2). The duplicate description will be omitted here.

As shown in FIG. 18, a part of the light focused on the second signal plane 6b does not reach the second signal plane 6b and is reflected by the first signal plane 6a to be returned light 8b. The returned light 8b is converged by the objective lens 5 and enters the hologram 4 to be diffracted by the hologram 4. The returned light 8b diffracted by the hologram 4 then is converged by the collimator lens 3 and is reflected by a split plane 2a of the beam splitter 2, whereby the light path of the returned light 8b is bent. The returned light 8a whose light path has been bent is focused on the photodetector 7 in a diffused state (the light path of a 0th-order diffracted light beam is indicated with a dashed line.). Note here that the focal point of the returned light 8b is on the back side of the focal point of the returned light 8a (i.e., on the side farther from the beam splitter 2).

As in the case of FIG. 17, a point 80S shown in FIG. 19 is a position where 0th-order diffracted light beams derived from the first quadrant light beam 81a, the second quadrant light beam 82a, the third quadrant light beam 83a, and the fourth quadrant light beam 84a that have passed through the hologram 4 are focused. The shapes of the light spots formed by the returned light 8a on the detecting part of the photodetector 7 are the same as those shown in FIG. 17. In contrast, the shapes of the light spots formed by the returned light 8b on the detecting part of the photodetector 7 correspond to a pattern obtained by inverting the shapes of the light spots on the detecting part shown in FIG. 12 with respect to the point 80S. Note here that the above-described light spots are identical to the light spots shown in FIG. 14 in the above-described third embodiment, except for a larger interval between the 1st-order diffracted light beams and the −1st-order diffracted light beams.

Some of the detector cells are electrically connected, so that the following seven signals can be obtained.

S1=a signal obtained in the detector cell 72+a signal obtained in the detector cell 74+a signal obtained in the detector cell 76

S2=a signal obtained in the detector cell 73+a signal obtained in the detector cell 75

S3a=a signal obtained in the detector cell 72a'+a signal obtained in the detector cell 74a'+a signal obtained in the detector cell 76a'

S3b=a signal obtained in the detector cell 72b'+a signal obtained in the detector cell 74b'+a signal obtained in the detector cell 76b'

S4a=a signal obtained in the detector cell 73a'+a signal obtained in the detector cell 75a'

S4b=a signal obtained in the detector cell 73b'+a signal obtained in the detector cell 75b'

S5=a signal obtained in the detector cell 71+a signal obtained in the detector cell 77+a signal obtained in the detector cell 71'+a signal obtained in the detector cell 77'

With the arrow 6R shown in FIG. 16 indicating the radial direction of the optical disk (note here that the direction of the arrow 6R relative to the hologram 4 and the photodetector 7 is rotated by 90° as compared with the case of the above-described third embodiment), a focus error signal FE that indicates an error in focusing light on the first signal plane 6a or the second signal plane 6b of the optical disk, a tracking error signal TE that indicates an error in tracking an optical disk track, a reproduction signal RF that is reproduced from the optical disk signal plane, and a stray light signal SL obtained from the proximity plane are detected based on the following formulae (15) to (18).

$$FE=S1+S4a+S4b-(S2+S3a+S3b) \quad \text{Formula (15)}$$

$$TE=S3b+S4b-S3a-S4a \quad \text{Formula (16)}$$

$$RF=S1+S2+S3a+S3b+S4a+S4b-S5 \quad \text{Formula (17)}$$

$$SL=S5 \quad \text{Formula (18)}$$

As in the above-described third embodiment, in FIG. 17, the light spots 8a1S, 8a2S, 8a3S, and 8a4S are within the detector cells 72 to 76, the light spots 8b1S, 8b2S, 8b3S, and 8b4S are approximately within the detector cells 71 and 77, and the light spots 8a1S', 8a2S', 8a3S', 8a4S', 8b1S', 8b2S', 8b3S', and 8b4S' are within the detector cells 72' to 76'. On the other hand, in FIG. 19, the light spots 8a1S', 8a2S', 8a3S', and 8a4S' are within the detector cells 72' to 76', the light spots 8b1S', 8b2S', 8b3S', and 8b4S' are approximately within the detector cells 71' and 77', and the light spots 8a1S, 8a2S, 8a3S, 8a4S, 8b1S, 8b2S, 8b3S, and 8b4S are within the detector cells 72 to 76. Therefore, regardless of whether the focal point on the optical disk is on the first signal plane 6a or on the second signal plane 6b, the signal SL represented by the formula (18) indicates the amount of stray light components from the proximity plane. On the other hand, since the amount of stray light components from the proximity plane included in S1+S2+S3a+S3b+S4a+S4b is equal to the amount of stray light components included in S5, the stray light components are removed substantially completely by the formula (17) for detecting the reproduction signal RF that is reproduced from the optical disk signal plane. Therefore, regardless of the recording state of the proximity plane or the presence of an address pit, accurate reading of the reproduction signal from the focus control plane becomes possible. In general, when signals are recorded on the second signal plane 6b, it is possible to control an intensity of a light spot for recording signals on the second signal plane 6b so as to allow accurate signal writing on the second signal plane 6b by estimating an amount of light passing through the first signal plane 6a from the stray light signal SL that indicates an amount of light reflected by the first signal plane 6a and then increasing/decreasing the output from the light source 1 based on this estimate value.

Furthermore, a focus error signal FE represented by the above Formula (15) is substantially the same as that in the first embodiment. That is, the relationship between defocus and a focus error signal FE in the present embodiment is approximately given by FIG. 8. Therefore, it may be considered that the proximity plane has substantially no effect on focus control. This is apparent from the following fact. When a focal point on the signal plane is focused, in FIG. 17, most of the regions of the light spots 8b1S, 8b2S, 8b3S, and 8b4S formed by the stray light components from the proximity plane are outside the detector cells 72 to 76 so that the stray light components are not detected as the signal F1 or F2, and the light spots 8b1S', 8b2S', 8b3S', and 8b4S' formed by the stray light components extend so as to cover almost an entire area of the detector cells 72' to 76', the stray light components are cancelled so as not to be detected as the focus error signal FE.

Also, in FIG. 19, most of the regions of the light spots 8b1S', 8b2S', 8b3S', and 8b4S' formed by the stray light components from the proximity plane are outside the detector cells 72' to 76' so that the stray light components are not detected as the signal F1 or F2, and the light spots 8b1S, 8b2S, 8b3S, and 8b4S formed by the stray light components extend so as to cover almost an entire area of the detector cells 72 to 76, the stray light components are cancelled so as not to be detected as the focus error signal FE.

For the reasons stated above, accurate focusing with respect to the focus control plane is not disturbed, thereby allowing accurate signal reading or writing. In the present embodiment, parting lines between adjacent detector cells are aligned in the light diffraction direction. Thus, when the wavelength of light emitted from the light source 1 is varied, the light spots are displaced along the parting lines. Therefore, the present embodiment is advantageous in that, even when the interval between the 1st-order diffracted light beams and the −1st-order diffracted light beams becomes larger, it has no effect on the focus error signal FE or the like. Moreover, even when the objective lens 5 is shifted in the radial direction 6R of the optical disk, the effect thereof is less liable to occur because the light spots on the detection plane are displaced along the parting lines.

Fifth Embodiment

Figure 20:
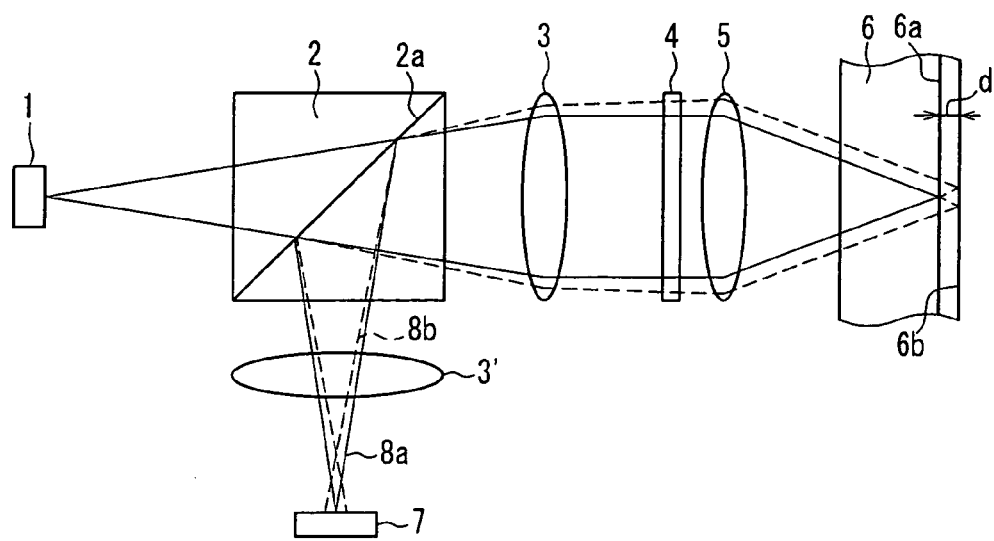
FIG. 20 is a schematic cross-sectional view showing an optical disk device according to a fifth embodiment of the present invention (in the case where light is focused on a first signal plane of an optical disk).
Figure 21:
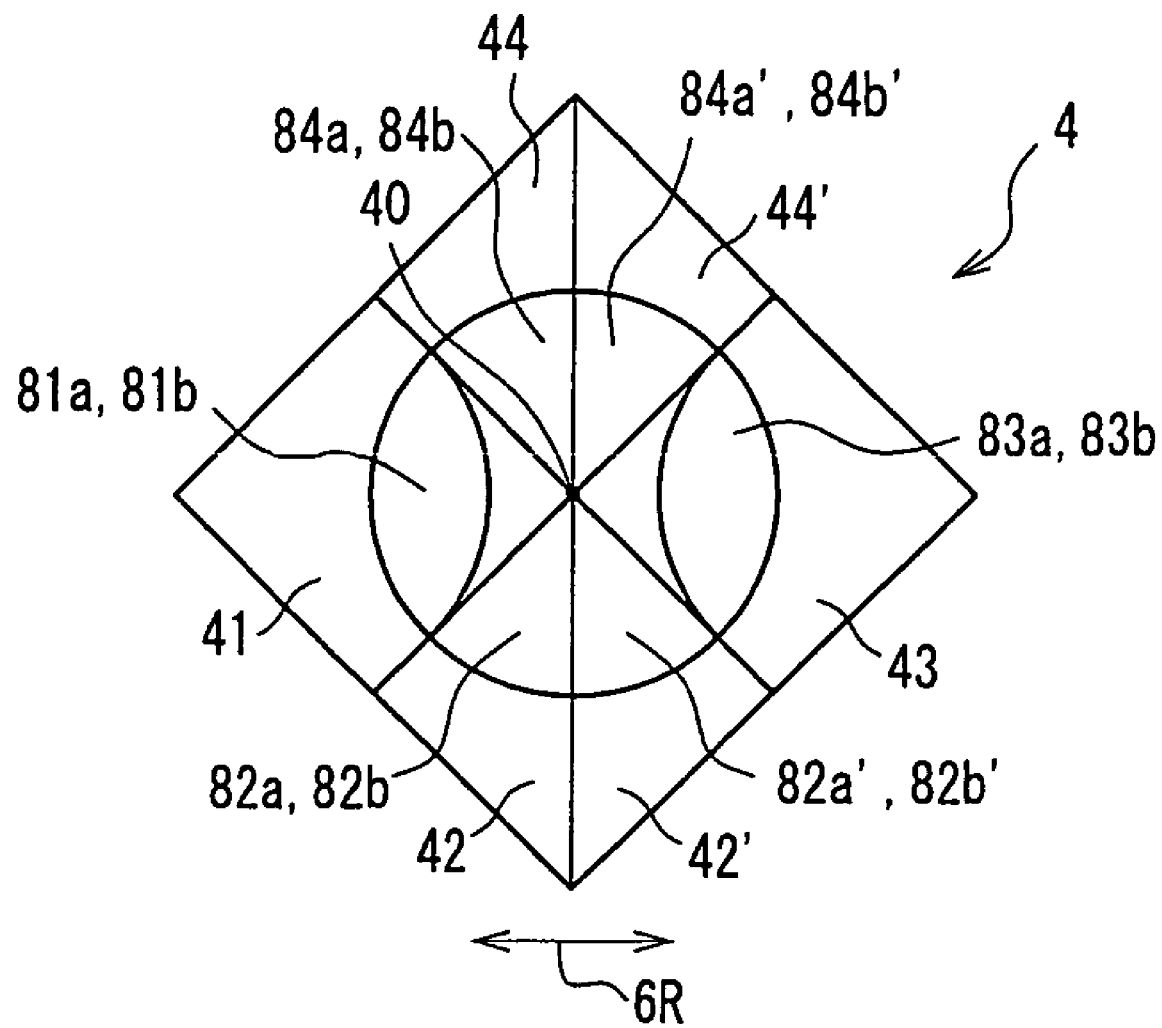
FIG. 21 shows a hologram pattern formed on a hologram that serves as an optic splitter in the optical disk device according to the fifth embodiment of the present invention.
Figure 22A:
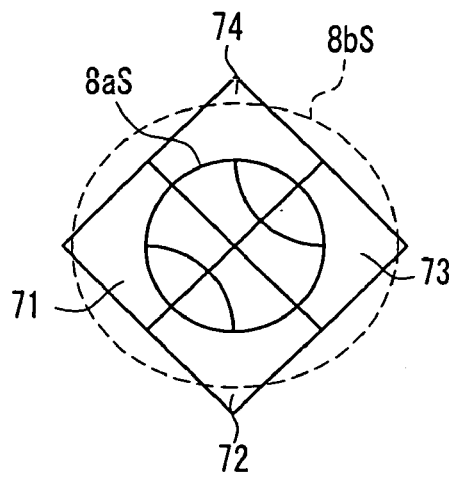
FIG. 22A shows one example of the light distribution and FIG. 22B shows another example of the light distribution.
Figure 22A:
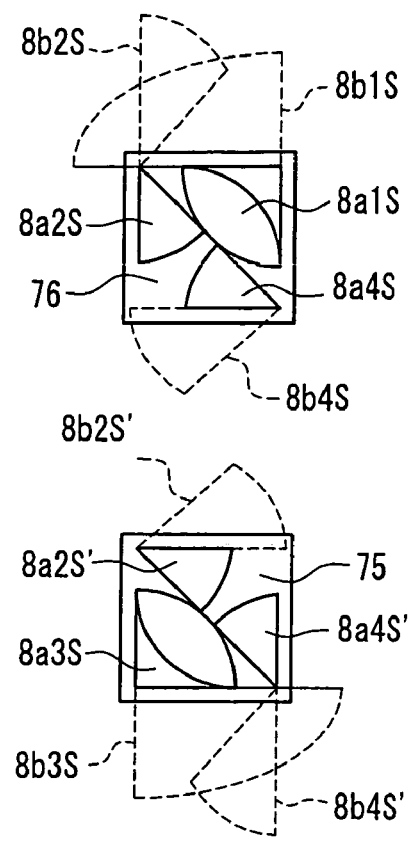
Figure 22B:
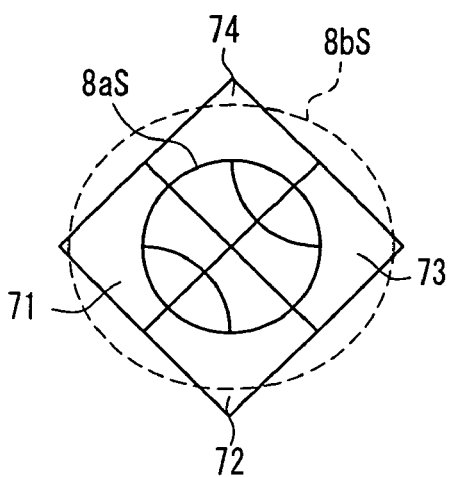
Figure 22B:
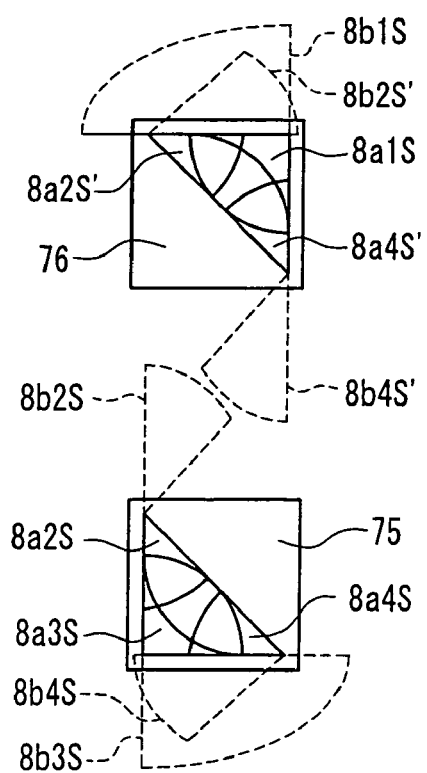
Figure 23:
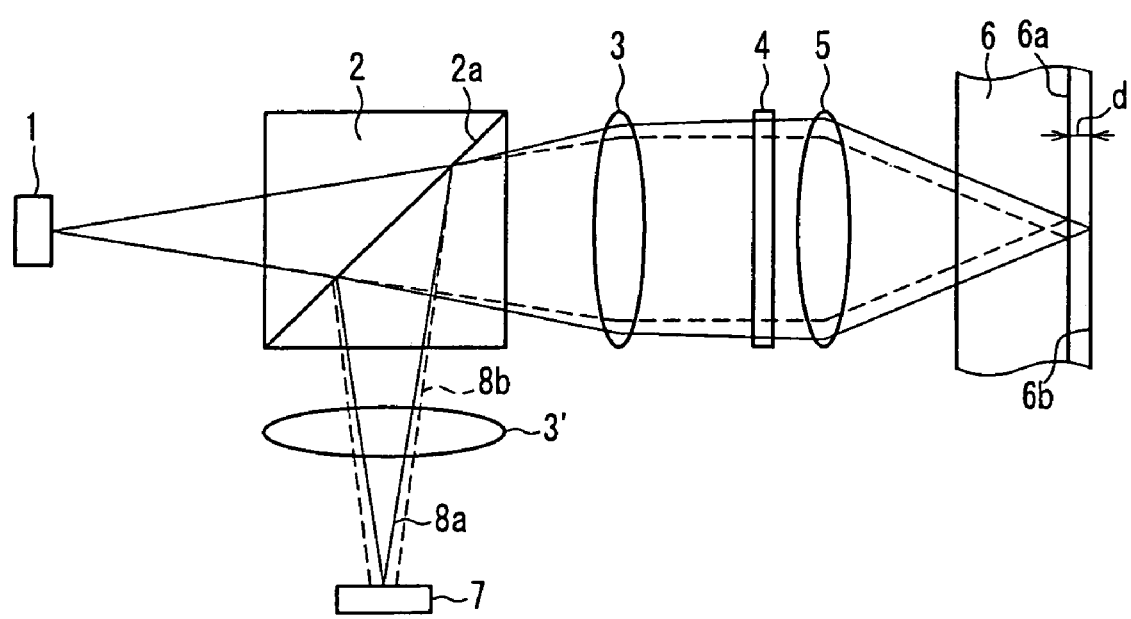
FIG. 23 is a schematic cross-sectional view showing the optical disk device according to the fifth embodiment of the present invention (in the case where light is focused on a second signal plane of the optical disk).

FIG. 20 is a schematic cross-sectional view of an optical disk device according to a fifth embodiment of the present invention (in the case where light is focused on a first signal plane of an optical disk). FIG. 21 shows a hologram pattern formed on a hologram that serves as an optical splitter in this optical disk device, FIG. 22 shows a photodetection pattern formed on a photodetector that is used in the optical disk device and light distribution on the photodetector in the state shown in FIG. 20, FIG. 23 is a schematic cross-sectional view showing the optical disk device according to the fifth embodiment of the present invention (in the case where light is focused on a second signal plane of the optical disk), and FIG. 24 shows a photodetection pattern formed on the photodetector that is used in the optical disk device and light distribution on the photodetector in the state shown in FIG. 23. The optical disk device of the present embodiment is the same as the optical disk device of the above-described first embodiment except that a cylindrical lens 3' is provided instead of the diffraction grating 9 and a hologram pattern on a hologram 4 and a photodetection pattern on a photodetector 7 are different from those in the optical disk device of the first embodiment. The elements common to the optical disk device of the present embodiment and the optical disk device of the first embodiment are indicated with the same numerals and characters as those used for describing the optical disk device of the first embodiment. The cylindrical lens 3' is arranged so that its column direction (i.e., the direction in which a body portion of the cylindrical lens 3' connecting its ends extends) is rotated about the optical axis by 45° with respect to the sheet of FIGS. 20 and 23.

As shown in FIG. 21, the hologram 4 is divided into six regions, namely, a first quadrant 41, one half 42 and the other half 42' of a second quadrant 42, a third quadrant 43, and one half 44 and the other half 44' of a fourth quadrant 44, by straight lines that intersect with each other at an intersection point 40 of the optical axis and a surface of the hologram 4. A pattern is formed in each of these six regions. Parting lines between the respective regions are aligned so as to form an angle of 45° or 90° with the radial direction 6R of an optical disk.

As shown in FIG. 22, a reproduction signal detecting part of the photodetector 7 includes detector cells 71 to 76.

As shown in FIG. 20, light emitted from the light source 1 passes through the beam splitter 2 and is converged by the collimator lens 3 to turn into parallel light. After passing through the hologram 4, the parallel light is focused on the first signal plane 6a of the optical disk by the objective lens 5 (the light path is indicated with a solid line). Returned light 8a, which is the light reflected by the first signal plane 6a, is converged by the objective lens 5 and enters the hologram 4 to be diffracted by the hologram 4. The returned light 8a diffracted by the hologram 4 then is converged by the collimator lens 3 and is reflected by a split plane 2a of the beam splitter 2, whereby the light path of the returned light 8a is bent. The returned light 8a whose light path has been bent passes through the cylindrical lens 3' and then is focused on the photodetector 7 in a diffused state (the light path of a 0th-order diffracted light beam is indicated with a solid line). Since the returned light 8a passes through the cylindrical lens 3' that is arranged so that its column direction is rotated about the optical axis by 45° with respect to the sheet of FIG. 20 and astigmatism further is imparted to the rotation direction about the optical axis, the returned light 8a is focused in the vicinity of a circle of least confusion on the photodetector 7. As a result, the light distribution on the photodetector 7 corresponds to a pattern obtained by rotating the light distribution on the aperture surface about the optical axis by 90°.

The first signal plane 6a of the optical disk is semi-transparent. Thus, among light focused on the first signal plane 6a, light passing through the first signal plane 6a reaches the second signal plane 6b. Then, returned light 8b, which is the light reflected by the second signal plane 6b, passes through the first signal plane 6a again, is converged by the objective lens 5, and enters the hologram 4 to be diffracted by the hologram 4. The returned light 8b diffracted by the hologram 4 then is converged by the collimator lens 3 and is reflected by the split plane 2a of the beam splitter 2, whereby the light path of the returned light 8b is bent. The returned light 8b whose light path has been bent is converged by the collimator lens 3 and is reflected by the split plane 2a of the beam splitter 2, whereby the light path of the returned light 8b is bent. The returned light 8a whose light path has been bent passes through the cylindrical lens 3' and then is focused on the photodetector 7 in a diffused state (the light path of a 0th-order diffracted light beam is indicated with a dashed line). Note here that the focal point of the returned light 8b is on the front side of the focal point of the returned light 8a (i.e., on the side closer to the beam splitter 2) and the returned light 8b also passes through the cylindrical lens 3' as in the case of the returned light 8a. Thus, astigmatism further is imparted to the returned light 8b so that the light distribution on the photodetector 7 corresponds to a pattern obtained by rotating the light distribution on the aperture surface about the optical axis by 90°.

As described above, the hologram 4 is divided into six regions, namely, the first quadrant 41, the half 42 and the other half 42' of the second quadrant 42, the third quadrant 43, and the half 44 and the other half 44' of the fourth quadrant 44, by the straight lines that intersect with each other at the intersection point 40 of the optical axis and a surface of the hologram 4. The returned light 8 from the first signal plane 6a (or the second signal plane 6b) of the optical disk is divided into six light beams, namely, a first quadrant light beam 81a (or 81b), second quadrant light beams 82a (or 82b) and 82a' (or 82b'), a third quadrant light beam 83a (or 83b), fourth quadrant light beams 84a (or 84b) and 84a' (or 84b'), by the respective regions of the hologram 4. These quadrant light beams are diffracted in the respective regions.

The hologram 4 achieves a diffraction efficiency of about 10% for a 0th-order light beam and a diffraction efficiency of about 35% for ±1st-order light beams, or alternatively, a diffraction efficiency of about 70% for a 0th-order light beam and a diffraction efficiency of about 10% for ±1st-order light beams, for example.

When the returned light 8a is projected on the reproduction signal detecting part of the photodetector 7, as shown in FIGS. 21 and 22, a light spot 8aS is a focal spot of 0th-order diffracted light beams derived from the first quadrant light beam 81a, the second quadrant light beams 82a and 82a', the third quadrant light beam 83a, and the fourth quadrant light beams 84a and 84a' that have passed through the hologram 4. The light spot 8aS is focused on the four equally-divided detector cells 71 to 74 so as to be within these detector cells. Light spots 8a1S, 8a2S, 8a2S', 8a3S, 8a4S, and 8a4S' are focal spots of 1st-order diffracted light beams derived from the first quadrant light beam 81a, the second quadrant light beams 82a and 82a', the third quadrant light beam 83a, and the fourth quadrant light beams 84a and 84a'. In the example shown in FIG. 22A, the light spots 8a1S, 8a2S, and 8a4S are within the detector cell 76 and the light spots 8a2S', 8a3S, and 8a4S' are within the detector cell 75. In the example shown in FIG. 22B, the light spots 8a1S, 8a2S', and 8a4S' are within the detector cell 76 and the light spots 8a2S, 8a3S, and 8a4S are within the detector cell 75.

When the returned light 8b is projected on the reproduction signal detecting part of the photodetector 7, as shown in FIGS. 21 and 22, a light spot 8bS is a focal spot of 0th-order diffracted light beams derived from the first quadrant light beam 81b, the second quadrant light beams 82b and 82b', the third quadrant light beam 83b, and the fourth quadrant light beams 84b and 84b' that have passed through the hologram 4. The light spot 8bS is focused on the four equally-divided detector cells 71 to 74. Light spots 8b1S, 8b2S, 8b2S', 8b3S, 8b4S, and 8b4S' are focal spots of 1st-order diffracted light beams derived from the first quadrant light beam 81b, the second quadrant light beams 82b and 82b', the third quadrant light beam 83b, and the fourth quadrant light beams 84b and 84b'. In the example shown in FIG. 22A, the light spots 8b1S, 8b2S, and 8b4S only slightly lie over a portion of the detector cell 76 in the vicinity of its boundaries and most regions thereof are outside the detector cell 76 and the light spots 8b2S', 8b3S, and 8b4S' only slightly lie over a portion of the detector cell 75 in the vicinity of its boundaries and most regions thereof are outside the detector cell 75. In the example shown in FIG. 22B, the light spots 8b1S, 8b2S', and 8b4S' only slightly lie over a portion of the detector cell 76 in the vicinity of its boundaries and most regions thereof are outside the detector cell 76 and the light spots 8b2S, 8b3S, and 8b4S only slightly lie over a portion of the detector cell 75 in the vicinity of its boundary and most regions thereof are outside the detector cell 75.

FIG. 23 is identical to FIG. 20 except that the focal point of the objective lens 5 is on the second signal plane 6b of the optical disk and the focal point of the returned light 8b is on the back side of the focal point of the returned light 8a (i.e., on the side farther from the beam splitter 2). The duplicate description will be omitted here.

As shown in FIG. 23, a part of the light focused on the second signal plane 6b does not reach the second signal plane 6b and is reflected by the first signal plane 6a to be returned light 8b. The returned light 8b is converged by the objective lens 5 and enters the hologram 4 to be diffracted by the hologram 4. The returned light 8b diffracted by the hologram 4 then is converged by the collimator lens 3 and is reflected by a split plane 2a of the beam splitter 2, whereby the light path of the returned light 8*b* is bent. The returned light 8*a* whose light path has been bent is focused on the photodetector 7 in a diffused state (the light path of a 0th-order diffracted light beam is indicated with a dashed line.). Note here that the focal point of the returned light 8*b* is on the back side of the focal point of the returned light 8*a* (i.e., on the side farther from the beam splitter 2).

Figure 24A:
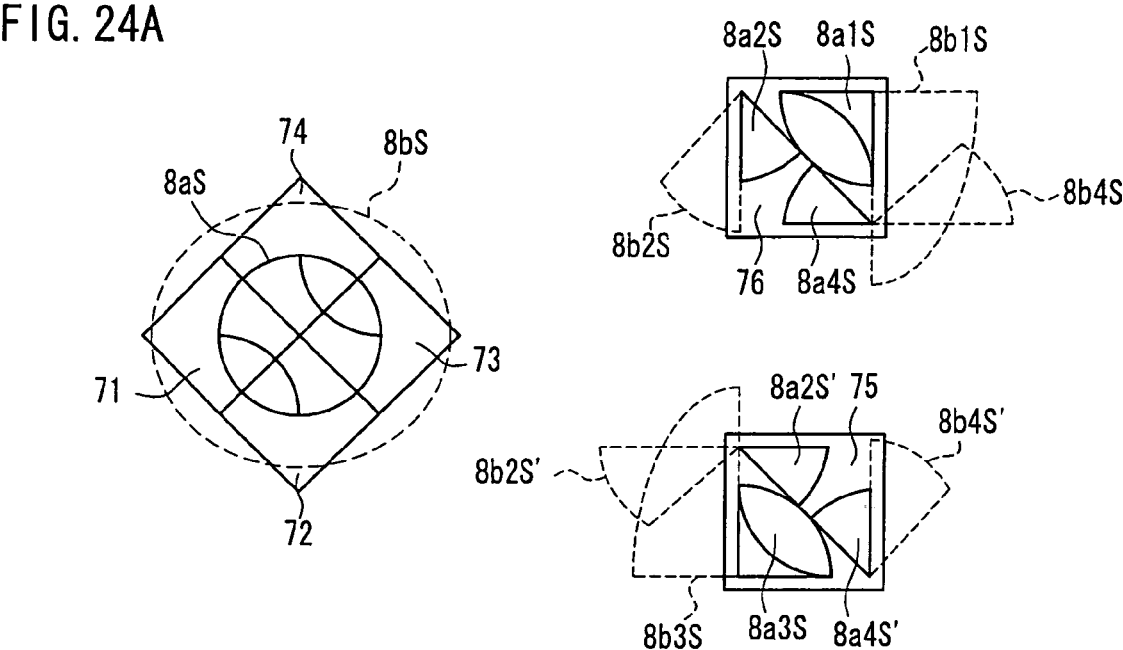
FIG. 24A shows one example of the light distribution and FIG. 24B shows another example of the light distribution.
Figure 24B:
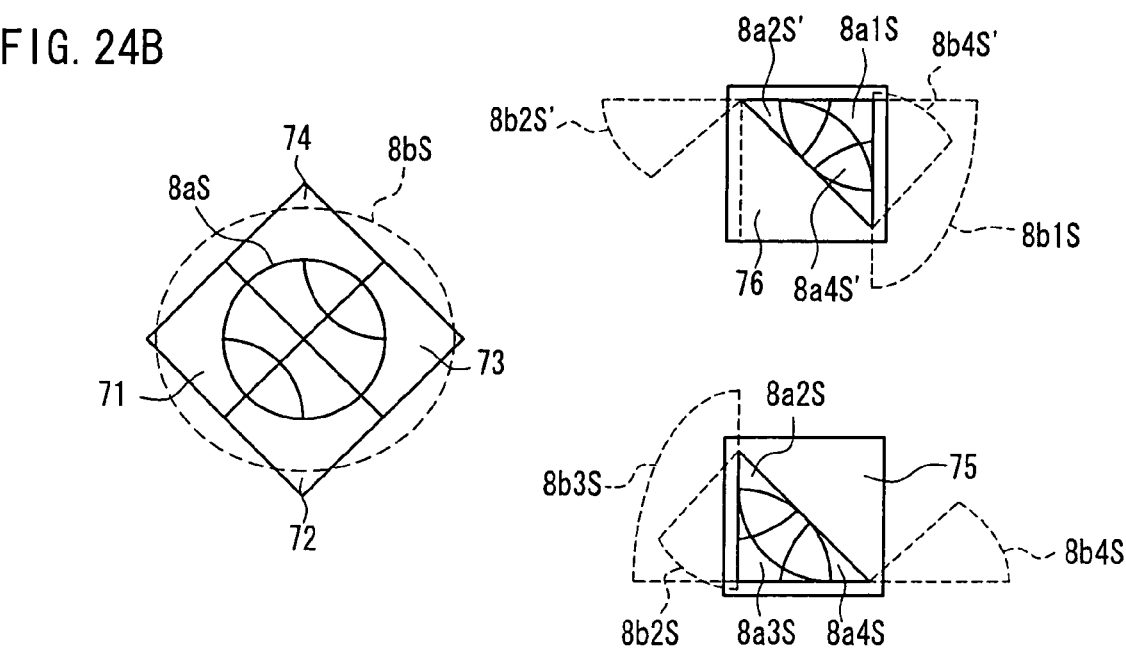

When the returned light 8*a* is projected on the reproduction signal detecting part of the photodetector 7, as shown in FIGS. 21 and 24, a light spot 8*a*S is a focal spot of 0th-order diffracted light beams derived from the first quadrant light beam 81*a*, the second quadrant light beams 82*a* and 82*a*', the third quadrant light beam 83*a*, and the fourth quadrant light beams 84*a* and 84*a*' that have passed through the hologram 4. The light spot 8*a*S is focused on the four equally-divided detector cells 71 to 74 so as to be within these detector cells. Light spots 8*a*1S, 8*a*2S, 8*a*2S', 8*a*3S, 8*a*4S, and 8*a*4S' are focal spots of 1st-order diffracted light beams derived from the first quadrant light beam 81*a*, the second quadrant light beams 82*a* and 82*a*', the third quadrant light beam 83*a*, and the fourth quadrant light beams 84*a* and 84*a*'. In the example shown in FIG. 24A, the light spots 8*a*1S, 8*a*2S, and 8*a*4S are within the detector cell 76 and the light spots 8*a*2S', 8*a*3S, and 8*a*4S' are within the detector cell 75. In the example shown in FIG. 24B, the light spots 8*a*1S, 8*a*2S', and 8*a*4S' are within the detector cell 76 and the light spots 8*a*2S, 8*a*3S, and 8*a*4S are within the detector cell 75.

When the returned light 8*b* is projected on the reproduction signal detecting part of the photodetector 7, as shown in FIGS. 21 and 24, a light spot 8*b* S is a focal spot of 0th-order diffracted light beams derived from the first quadrant light beam 81*b*, the second quadrant light beams 82*b* and 82*b*', the third quadrant light beam 83*b*, and the fourth quadrant light beams 84*b* and 84*b*' that have passed through the hologram 4. The light spot 8*b*S is focused on the four equally-divided detector cells 71 to 74. Light spots 8*b*1S, 8*b*2S, 8*b*2S', 8*b*3S, 8*b*4S, and 8*b*4S' are focal spots of 1st-order diffracted light beams derived from the first quadrant light beam 81*b*, the second quadrant light beams 82*b* and 82*b*', the third quadrant light beam 83*b*, and the fourth quadrant light beams 84*b* and 84*b*'. In the example shown in FIG. 24A, the light spots 8*b*1S, 8*b*2S, and 8*b*4S only slightly lie over a portion of the detector cell 76 in the vicinity of its boundaries and most regions thereof are outside the detector cell 76 and the light spots 8*b*2S', 8*b*3S, and 8*b*4S' only slightly lie over a portion of the detector cell 75 in the vicinity of its boundaries and most regions thereof are outside the detector cell 75. In the example shown in FIG. 24B, the light spots 8*b*1S, 8*b*2S', and 8*b*4S' only slightly lie over a portion of the detector cell 76 in the vicinity of its boundaries and most regions thereof are outside the detector cell 76 and the light spots 8*b*2S, 8*b*3S, and 8*b*4S only slightly lie over a portion of the detector cell 75 in the vicinity of its boundary and most regions thereof are outside the detector cell 75.

From the above-described detector cells, the following six signals are obtained.

S1=a signal obtained in the detector cell 71
S2=a signal obtained in the detector cell 72
S3=a signal obtained in the detector cell 73
S4=a signal obtained in the detector cell 74
S5=a signal obtained in the detector cell 75
S6=a signal obtained in the detector cell 76

With the arrow 6R shown in FIG. 21 indicating the radial direction of the optical disk, a focus error signal FE that indicates an error in focusing light on the first signal plane 6*a* or the second signal plane 6*b* of the optical disk, a tracking error signal TE that indicates an error in tracking an optical disk track, and a reproduction signal RF that is reproduced from the optical disk signal plane are detected based on the following formulae (19) to (21).

$$FE = S1 + S3 - S2 - S4 \qquad \text{Formula (19)}$$

$$TE = S5 - S6 \qquad \text{Formula (20)}$$

$$RF = S5 + S6 \qquad \text{Formula (21)}$$

Note here that the focus error detection method based on the above formula (19) is a focus error detection method according to a so-called astigmatism method. In the above formula (20), the light beams on the detector cells 75 and 76 are used for tracking error detection. Thus, regardless of whether the focal point on the optical disk is on the first signal plane 6*a* side or the second signal plane 6*b* side, an effect of stray light components from the proximity plane can be reduced to a negligible level, thereby allowing stable tracking control. Moreover, in the above formula (21), the light beams on the detector cells 75 and 76 are used for detection of the reproduction signal RF. Thus, the stray light components can be removed substantially completely. As a result regardless of the recording state of the proximity plane or the presence of an address pit, accurate reading of the reproduction signal from the focus control plane becomes possible. Note here that the configurations shown in FIG. 22B and FIG. 24B correspond to the configurations shown in FIG. 22A and FIG. 24A in which the positions of the light spots (8*a*2S and 8*a*4S, 8*a*2S' and 8*a*4S') formed by the light beams from the regions containing no tracking error signal TE (i.e., the regions in which a 0th-order light beam and ±1st-order light beams diffracted at grooves of the optical disk do not overlap with each other) are interchanged. Although there is no difference in tracking sensitivity, the interchanging of the positions of the light spots allows the tracking error detection method to be such that an effect of the shift of the objective lens 5 (deviation of the central axis of the objective lens 5 from the optical axis due to the tracking control) can be cancelled.

The optical disk device according to the present embodiment may be configured so that a detector cell 77 (not shown) for catching stray light components from the proximity plane is arranged so as to surround the detector cells 75 and 76 and the stray light signal SL from the proximity plane is detected by this detector cell 77. In this case, the size of the detector cells 71 to 74 may be set so that the stray light components from the proximity plane are completely within the detector cells 71 to 74, and the reproduction signal RF that is reproduced from the optical disk signal plane may be detected based on the following formula (22) where S7 denotes a signal obtained in the detector cell 77.

$$RF = S1 + S2 + S3 + S4 - m \times S7 \qquad \text{Formula (22)}$$

In the above formula (22), a coefficient m is a value relating to a diffraction efficiency of the hologram 4 and is determined by the following formula.

$m$=0th-order diffraction efficiency/1st-order diffraction efficiency

By detecting the reproduction signal RF that is reproduced from the optical disk signal plane based on the above formula (22), the stray light components can be removed substantially completely, so that, regardless of the recording state of the proximity plane or the presence of an address pit, accurate reading of the reproduction signal from the focus control plane becomes possible. Furthermore, when signals are recorded on the second signal plane 6*b*, it is possible to control an intensity of a light spot for recording signals on the second signal plane 6b so as to allow accurate signal writing on the second signal plane 6b by estimating an amount of light passing through the first signal plane 6a from the stray light signal SL that indicates an amount of light reflected by the first signal plane 6a and then increasing/decreasing the output from the light source 1 based on this estimate value.

In the above, the optical disk devices of the first to fifth embodiments of the present invention were described specifically. Note here that the optical disk devices of these embodiments differ from conventional optical disk devices in that a light spot formed by light from a focus control plane of an optical disk on which a focusing operation is being performed and a light spot formed by light from a proximity plane are inverted with respect to a diffraction optical axis on a detection plane (in other words, one returned light is focused on the front side of the detection plane and the other returned light is focused on the back side of the detection plane) and the light spots formed by the respective returned lights are detected separately by different detector cells (regions).

With this configuration, it becomes possible to perform the detection and removal of stray light components from the proximity plane at the same time. As long as the optical disk devices have this configuration, the same effect can be obtained even though the hologram pattern formed on the hologram or the photodetection pattern formed on the photodetector is different from those described above.

The above-described first to fifth embodiments are directed to an example where an optical disk has two signal planes arranged in proximity to each other. However, needless to say, the same effect can be obtained when the optical disk has three or more signal planes arranged in proximity to each other. Furthermore, the hologram 4 may be a polarization hologram, and may be arranged between the collimator lens 3 and the photodetector 7.

Note here that it is practically difficult to detect the two light spots completely separately because of an alignment error. However, if at least each of the detector cells (regions) can catch and detect at least 80% of the amount of light of the light spot formed thereon (in other words, if the amount of stray light contained in the light spot is 20% or less), there is no problem in practical use.

Figure 25A:
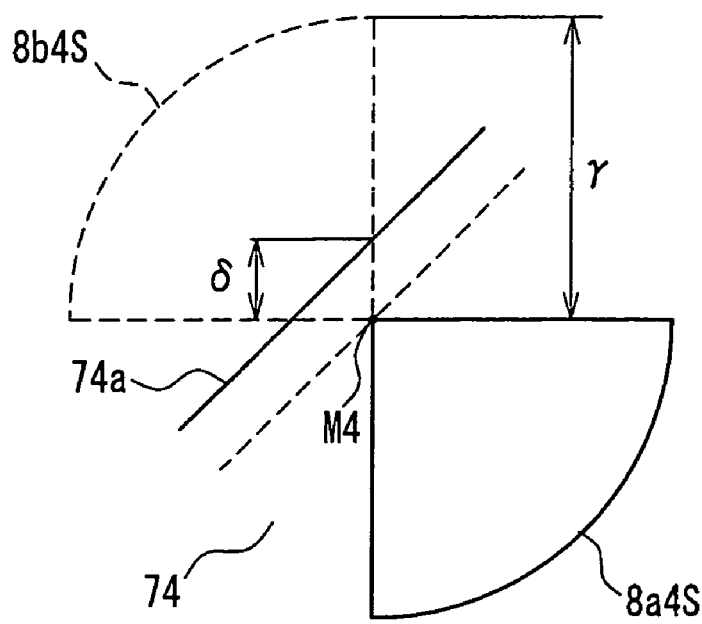
FIG. 25A shows how a light spot is formed in the vicinity of a parting line on a reproduction signal detecting part shown in FIG. 3.
Figure 25B:
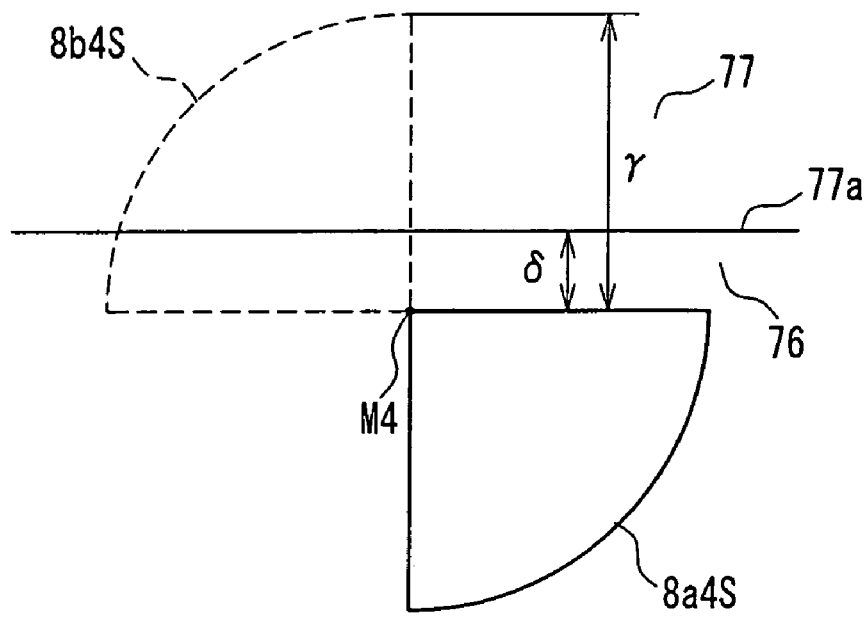
FIG. 25B shows how a light spot is formed in the vicinity of a parting line on a reproduction signal detecting part shown in FIG. 17.
Figure 26:
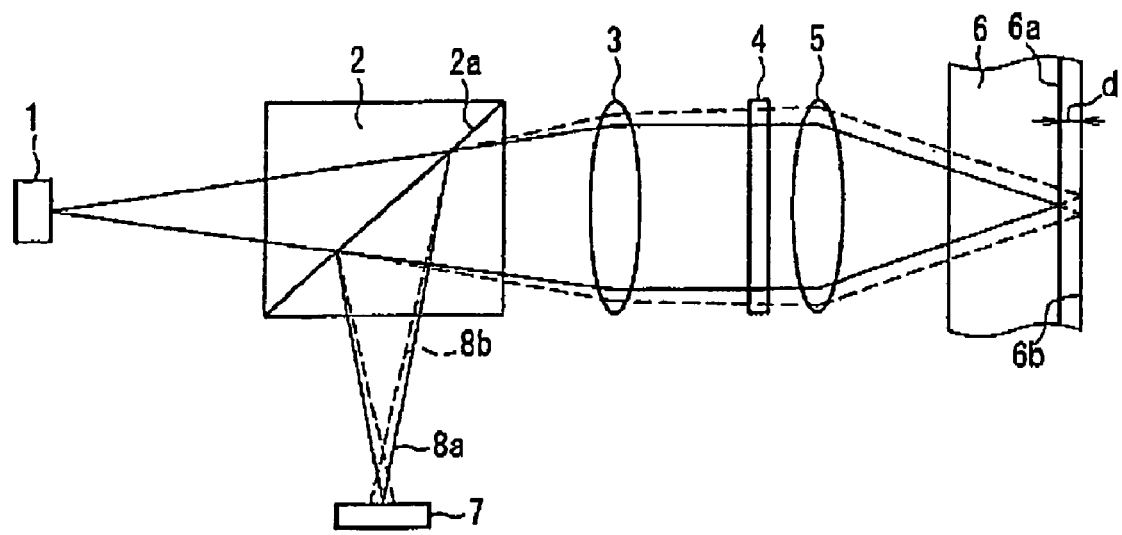
FIG. 26 is a schematic cross-sectional view of a conventional optical disk device the case where a focal point of an objective lens is on a first signal plane of an optical disk).
Figure 27:
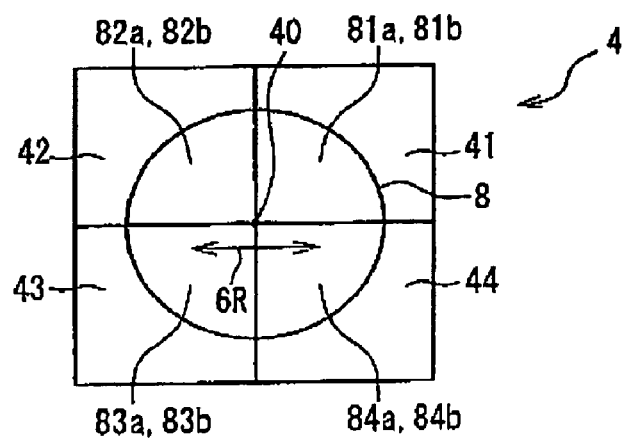
FIG. 27 shows a hologram pattern formed on a hologram that is used in the conventional optical disk device.
Figure 28:
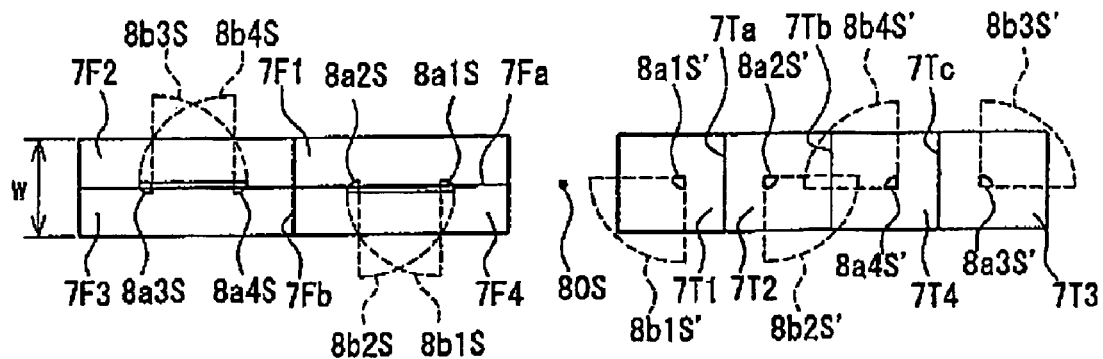
FIG. 28 shows a photodetection pattern formed on a photodetector that is used in the conventional optical disk device and light distribution on the photodetector in the state shown in FIG. 26.
Figure 29:
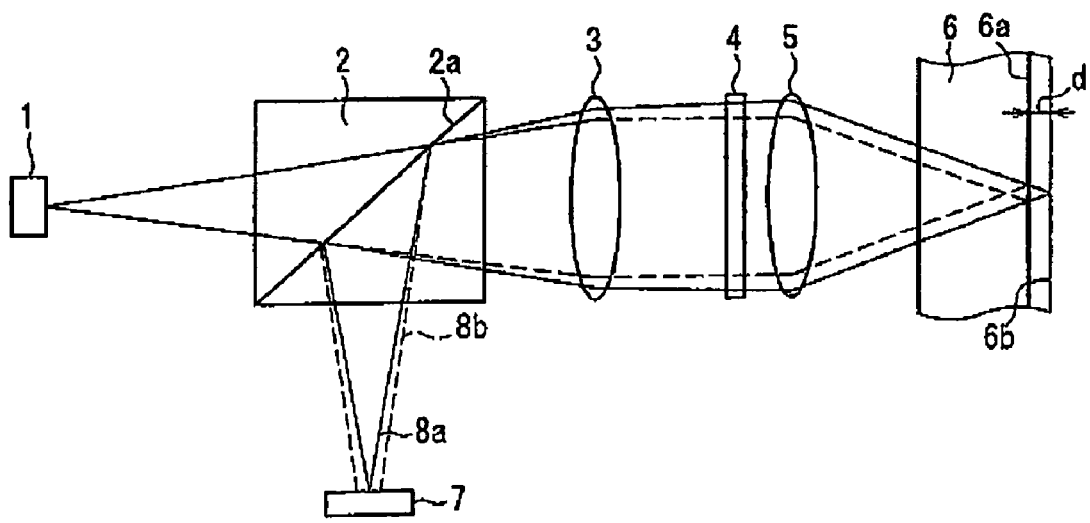
FIG. 29 is a schematic cross-sectional view showing the conventional optical disk device (in the case where a focal point of the objective lens is on a second signal plane of the optical disk).
Figure 30:
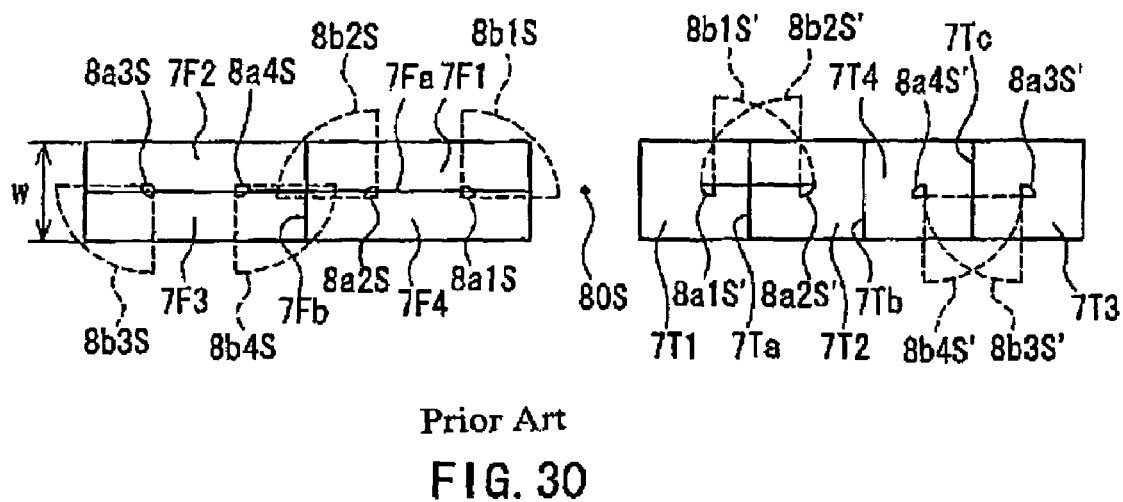
FIG. 30 shows a photodetection pattern formed on the photodetector that is used in the conventional optical disk device and light distribution on the photodetector in the state shown in FIG. 29.
Figure 31:
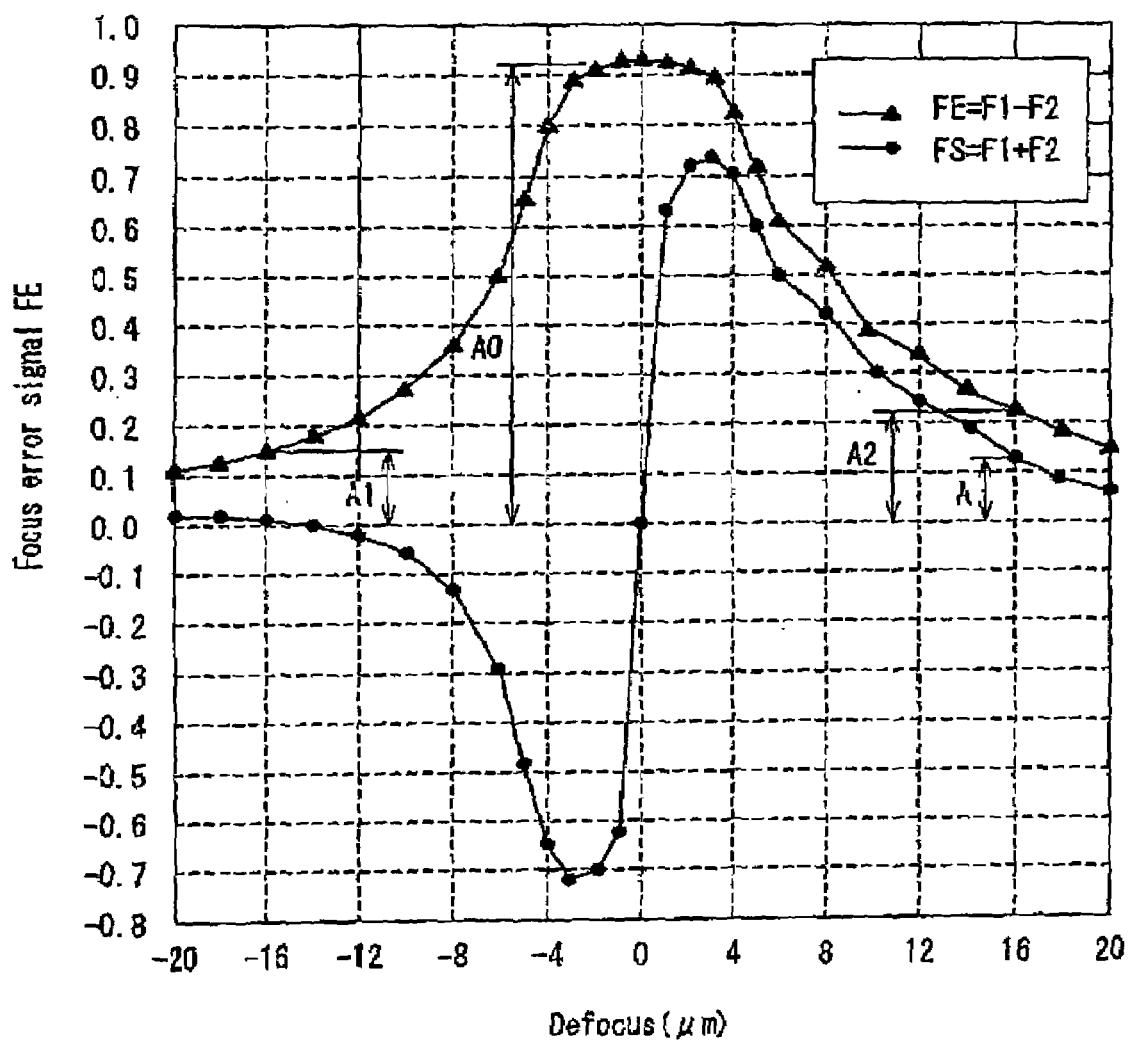
FIG. 31 is a graph showing the relationship between defocus and a focus error signal FE in the conventional optical disk device.

FIG. 25 shows the relationship between a light spot formed on a photodetection plane and a parting line when there is an alignment error. FIG. 25A shows how a light spot is formed in the vicinity of the parting line 74a on the reproduction signal detecting part shown in FIG. 3. As shown in FIG. 25A, when the parting line 74a shifts from an intersection point M4 of the diffraction optical axis $m_4$ and the detection plane by δ, the ratio of an amount of light leaking into the detector cell 74 to a total amount of light in the light spot 8b4S formed by light from the proximity plane is determined by $2/\Pi \times (\delta/r)^2$ where r denotes a diameter of the light spot formed by the light from the proximity plane. Accordingly, by the calculation with the amount of stray light contained in the light spot being set to 20%, an allowable position error of the light spot is δ=0.56r in the first embodiment. FIG. 25B shows how a light spot is formed in the vicinity of the parting line 77a on the reproduction signal detecting part shown in FIG. 17. As shown in FIG. 25B, when the parting line 77a between the detector cell 76 and the detector cell 77 shifts from an intersection point M4 of the diffraction optical axis $m_4$ and the detection plane by δ, the ratio of an amount of light leaking into the detector cell 76 to a total amount of light in the light spot 8b4S formed by light from the proximity plane is determined approximately by 4δ/Πr. Accordingly, by the calculation with the amount of stray light contained in the light spot being set to 20%, an allowable position error of the light spot is δ=0.16r in the fourth embodiment.

The invention claimed is:

1. An optical disk device comprising:
a light source;
an objective lens for focusing light emitted from the light source on an optical disk;
an optical splitter for diffracting the light reflected by the optical disk; and
a photodetector on which the light diffracted by the optical splitter is focused,
wherein the optical splitter is divided into n(n≧2) regions Ak(k=1, 2, . . . , n) by a straight line that intersects with an optical axis,
the photodetector is divided into at least two detection regions A and A',
the light emitted from the light source is focused on any one of a plurality of signal planes of the optical disk by the objective lens,
light reflected from the signal plane on which the light emitted from the light source is focused (the focused plane) and light reflected from a signal plane located in proximity to the focused plane (a proximity plane) pass through the objective lens to turn into light beams a and a', respectively, that enter the optical splitter,
1st-order diffracted light beams ak and ak' having a common diffraction optical axis are derived from the light beams a and a' that have entered the regions Ak of the optical splitter, respectively, and are projected on the photodetector,
distributions of the 1st-order diffracted light beams ak and ak' on the photodetector are approximately inverted with respect to an intersection point of the diffraction optical axis and a detection plane, and
the 1st-order diffracted light beam ak is mostly within the detection region A and the 1st-order diffracted light beam ak' is mostly within the detection region A'.

2. The optical disk device according to claim 1, wherein the photodetector has at least two detections regions B and B' in addition to the detection regions A and A',
−1st-order diffracted light beams bk and bk' having a common diffraction optical axis are derived from the light beams a and a' that have entered the regions Ak of the optical splitter, respectively, and are projected on the photodetector,
distributions of the −1st-order diffracted light beams bk and bk' on the photodetector are similar to each other with respect to the intersection point of the diffraction optical axis and the detection plane, and
the −1st-order diffracted light beams bk and bk' are both mostly within the detection region B.

3. An optic disk device comprising:
a light source;
an objective lens for focusing light emitted from the light source on an optical disk;
an optical splitter for diffracting the light reflected by the optical disk; and
a photodetector on which the light diffracted by the optical splitter is focused,
wherein the optical splitter is divided into n(n≧2) regions Bk(k=1, 2, . . . , n) by a straight line that intersects with an optical axis,
the photodetector is divided into at least two detection regions B and B', the light emitted from the light source is focused on any one of a plurality of signal planes of the optical disk by the objective lens, light reflected from the signal plane on which the light emitted from the light source is focused (the focused plane) and light reflected from a signal plane located in proximity to the focused plane (a proximity plane) pass through the objective lens to turn into light beams b and b', respectively, that enter the optical splitter, −1st-order diffracted light beams bk and bk' having a common diffraction optical axis are derived from the light beams b and b' that have entered the regions Bk of the optical splitter, respectively, and are projected on the photodetector, distributions of the −1st-order diffracted light beams bk and bk' on the photodetector are approximately inverted with respect to an intersection point of the diffraction optical axis and a detection plane, and the −1st-order diffracted light beam bk is mostly within the detection region B and the −1st-order diffracted light beam bk' is mostly within the detection region B'.

4. The optical disk device according to claim 3, wherein the photodetector has at least two detection regions A and A' in addition to the detection regions B and B', 1st-order diffracted light beams ak and ak' having a common diffraction optical axis are derived from the light beams b and b' that have entered the regions Bk of the optical splitter, respectively, and are projected on the photodetector, distributions of the 1st-order diffracted light beams ak and ak' on the photodetector are similar to each other with respect to the intersection point of the diffraction optical axis and the detection plane, and the 1st-order diffracted light beans ak and ak' are both mostly within the detection region A.

5. The optical disk device according to claim 2, wherein, where SA denotes a signal detected in the detection region A, SA' denotes a signal detected in the detection region A', SB denotes a signal detected in the detection region B, and SB' denotes a signal detected in the detection region B', when the light emitted from the light source is focused on a first signal plane of the optical disk, the signal SA is regarded as a reproduction signal that is reproduced from the first signal plane (the focused plane) and the signal SA' is regarded as a reflected signal from a second signal plane (a proximity plane), and when the light emitted from the light source is focused on the second signal plane of the optical disk, the signal SB is regarded as a reproduction signal that is reproduced from the second signal plane (the focused plane) and the signal SB' is regarded as a reflected signal from the first signal plane (the proximity plane).

6. The optical disk device according to claim 2, wherein, where SA denotes a signal detected in the detection region A, SA' denotes a signal detected in the detection region A', SB denotes a signal detected in the detection region B, and SB' denotes a signal detected in the detection region B', a signal SA+SB−SA'−SB' is regarded as a reproduction signal that is reproduced from the signal plane on which the light emitted from the light source is focused (the focused plane) and a signal SA'+SB' is regarded as a reflected signal from a signal plane located in proximity to the focused plane (a proximity plane).

7. The optical disk device according to claim 5, wherein, when the proximity plane is on a side closer to the objective lens with respect to the focused plane, an amount of light emitted from the light source is controlled in accordance with the reflected signal from the proximity plane.

8. The optical disk device according to claim 2, wherein a portion of the photodetector that includes the detection regions A and B and does not include the detection regions A' and B' is divided further into a plurality of regions, and a focus error signal that indicates an error in focusing with respect to the optical disk is generated by calculating signals detected in the plurality of regions.

* * * * *

UNITED STATES PATENT AND TRADEMARK OFFICE
CERTIFICATE OF CORRECTION

| | |
|---|---|
| PATENT NO. | : 7,142,489 B2 |
| APPLICATION NO. | : 10/530585 |
| DATED | : November 28, 2006 |
| INVENTOR(S) | : Nishiwaki et al. |

It is certified that error appears in the above-identified patent and that said Letters Patent is hereby corrected as shown below:

Column 38, line 15(claim 1): "AK(k=1, 2, ..., n)" should read --Ak(k=1, 2, ..., n)--.
Column 38, line 41(claim 2): "detections" should read --detection--.
Column 39, line 34(claim 4); "beans" should read --beams--.

Signed and Sealed this

Fifteenth Day of May, 2007

JON W. DUDAS
*Director of the United States Patent and Trademark Office*